(12) United States Patent
Ward

(10) Patent No.: US 9,878,825 B1
(45) Date of Patent: Jan. 30, 2018

(54) REUSABLE TOP FLAP ENVELOPE WITH DUAL OPPOSING SEAL FLAPS

(71) Applicant: ecoEnvelopes, LLC, Stillwater, MN (US)

(72) Inventor: Gale G. Ward, Saint Paul, MN (US)

(73) Assignee: ECOENVELOPES, LLC, Saint Paul, MN (US)

( * ) Notice: Subject to any disclaimer, the term of this patent is extended or adjusted under 35 U.S.C. 154(b) by 0 days.

(21) Appl. No.: 15/172,142

(22) Filed: Jun. 2, 2016

Related U.S. Application Data

(60) Provisional application No. 62/234,401, filed on Sep. 29, 2015, provisional application No. 62/170,128, filed on Jun. 2, 2015.

(51) Int. Cl.
| | |
|---|---|
| B65D 27/06 | (2006.01) |
| B65D 27/04 | (2006.01) |
| B65D 27/14 | (2006.01) |
| B65D 27/38 | (2006.01) |

(52) U.S. Cl.
CPC ............ *B65D 27/06* (2013.01); *B65D 27/04* (2013.01); *B65D 27/14* (2013.01); *B65D 27/38* (2013.01)

(58) Field of Classification Search
CPC ........ B65D 27/06; B65D 27/04; B65D 27/14; B65D 27/38
USPC ................................................ 229/301–306
See application file for complete search history.

(56) References Cited

U.S. PATENT DOCUMENTS

| | | |
|---|---|---|
| 192,522 A | 6/1877 | Marshall |
| 460,472 A | 9/1891 | Hitt |
| 500,996 A | 7/1893 | Cutter |
| 759,382 A | 5/1904 | Klugh |
| 886,449 A | 5/1908 | West |
| 932,715 A | 8/1909 | Morrison |
| 1,145,935 A | 7/1915 | Steinke |
| 1,173,869 A | 2/1916 | Rougeux |
| 1,187,258 A | 6/1916 | Carr et al. |
| 1,245,447 A | 11/1917 | Felenchak |
| 1,438,122 A | 12/1922 | McCoy |
| 1,953,192 A | 4/1934 | Rossiter |
| 1,957,704 A | 5/1934 | Drachman |
| 1,960,054 A | 5/1934 | Johnson |
| 1,988,908 A | 1/1935 | MacKinnon |
| 2,007,625 A | 7/1935 | Walters |

(Continued)

FOREIGN PATENT DOCUMENTS

| | | |
|---|---|---|
| CA | 2075214 A1 | 12/1993 |
| CA | 2138361 B1 | 8/1999 |

(Continued)

*Primary Examiner* — Jes F Pascua
(74) *Attorney, Agent, or Firm* — Albert W. Watkins

(57) ABSTRACT

Automation-compatible reusable envelopes are embedded in standard envelope layouts, having a top flap outgoing envelope and an opposing bottom return seal flap. The return flap is formed by a person removing a unique flared tear strip that removes undesirable outgoing postal codes, and also forms a tapered return seal flap. The unique flare at each end of the tear strip is formed with lines of weakness that primarily extend parallel to the long bottom edge of the envelope, but that also wrap from the face across the bottom edge and then to the side edge of the envelope. A security tab and/or bridge structure is formed by removing a tear strip on the envelope, allowing access into the envelope.

16 Claims, 9 Drawing Sheets

(56) References Cited

U.S. PATENT DOCUMENTS

| | | |
|---|---|---|
| 2,129,705 A | 9/1938 | Reineman |
| 2,201,538 A | 5/1940 | Holden |
| 2,310,371 A | 2/1943 | Lines et al. |
| 2,340,700 A | 2/1944 | Sawdon |
| 2,350,100 A | 5/1944 | Deutschmeister et al. |
| 2,350,802 A | 6/1944 | Nevin, Sr. |
| 2,363,957 A | 11/1944 | Goff |
| 2,400,406 A | 5/1946 | Godoy |
| 2,417,982 A | 3/1947 | Histed |
| 2,624,715 A | 1/1953 | Wildish |
| 2,835,512 A | 5/1958 | Whitman |
| 2,928,583 A | 3/1960 | Law |
| 2,941,711 A | 6/1960 | Biek |
| 2,954,154 A | 9/1960 | Mooney |
| 3,011,691 A | 12/1961 | McGlynn et al. |
| 3,062,431 A | 11/1962 | Rabenold |
| 3,073,509 A | 1/1963 | Schuessler |
| 3,086,695 A | 4/1963 | Lillibridge |
| 3,111,257 A | 11/1963 | Peach |
| 3,111,336 A | 11/1963 | Schumacher |
| 3,113,716 A | 12/1963 | Howard |
| 3,152,751 A | 10/1964 | Hiersteiner |
| 3,167,243 A | 1/1965 | Wiley |
| 3,184,150 A | 5/1965 | Hubbard |
| 3,227,360 A | 1/1966 | Krueger |
| 3,259,304 A | 7/1966 | Tichnor |
| 3,261,623 A | 7/1966 | Kiedrowski |
| 3,276,669 A | 10/1966 | Vilutis |
| 3,278,015 A | 10/1966 | Bernstein |
| 3,330,581 A | 7/1967 | Ivarsson-Wallerstrom |
| 3,368,672 A | 2/1968 | Heaney et al. |
| 3,374,940 A | 3/1968 | Allison |
| 3,380,648 A | 4/1968 | De Lyra |
| 3,411,699 A | 11/1968 | Pine et al. |
| 3,426,961 A | 2/1969 | Allison |
| 3,452,509 A | 7/1969 | Hauer |
| 3,472,444 A | 10/1969 | Aliff, Jr. et al. |
| 3,473,034 A | 10/1969 | Goldstern |
| 3,498,528 A | 3/1970 | Klein |
| 3,507,444 A | 4/1970 | Werby |
| 3,525,469 A | 8/1970 | Sawdon |
| 3,531,046 A | 9/1970 | Carrigan |
| 3,537,637 A | 11/1970 | Hiersteiner |
| 3,545,669 A | 12/1970 | Kinkade et al. |
| 3,652,007 A | 3/1972 | MacDougall |
| 3,653,585 A | 4/1972 | Kazaros |
| 3,693,869 A | 9/1972 | Eaves, Jr. |
| 3,718,277 A | 2/1973 | Volkert |
| 3,747,837 A | 7/1973 | Wilson |
| 3,802,618 A | 4/1974 | Wiessner |
| 3,822,492 A | 7/1974 | Crawley |
| 3,874,582 A | 4/1975 | Wang |
| 3,899,127 A | 8/1975 | Melander |
| 3,910,410 A | 10/1975 | Shaw |
| 3,941,309 A | 3/1976 | Gendron |
| 3,946,938 A | 3/1976 | Kranz |
| 3,979,051 A | 9/1976 | Close |
| 3,982,689 A | 9/1976 | Retrum |
| 4,072,264 A | 2/1978 | Kranz |
| 4,084,694 A | 4/1978 | Lainez et al. |
| 4,157,759 A | 6/1979 | Dicker |
| 4,159,129 A | 6/1979 | Lockhart |
| 4,180,168 A | 12/1979 | Hiersteiner |
| 4,190,161 A | 2/1980 | Gendron |
| 4,190,162 A | 2/1980 | Buescher |
| 4,194,631 A | 3/1980 | Rangan |
| 4,245,775 A | 1/1981 | Conn |
| 4,288,028 A | 9/1981 | Diaz |
| 4,308,987 A | 1/1982 | Solomon |
| 4,317,030 A | 2/1982 | Berghell |
| 4,332,346 A | 6/1982 | Kronman |
| 4,334,618 A | 6/1982 | Buescher |
| 4,354,631 A | 10/1982 | Stevenson |
| 4,379,573 A | 4/1983 | Lomeli et al. |
| 4,382,539 A | 5/1983 | Kronman |
| 4,384,670 A | 5/1983 | Dicker |
| 4,403,696 A | 9/1983 | Newell |
| 4,436,202 A | 3/1984 | Berkley |
| 4,445,635 A | 5/1984 | Barr |
| 4,487,360 A | 12/1984 | Fisher et al. |
| 4,538,833 A | 9/1985 | Trikilis |
| 4,549,658 A | 10/1985 | Sfikas |
| 4,565,317 A | 1/1986 | Kranz |
| 4,570,416 A | 2/1986 | Shoenfeld |
| 4,586,611 A | 5/1986 | Scalzo |
| 4,602,736 A | 7/1986 | Barr |
| 4,613,157 A | 9/1986 | Drabish |
| 4,620,630 A | 11/1986 | Moss |
| 4,640,030 A | 2/1987 | Wood et al. |
| 4,651,920 A | 3/1987 | Stenner |
| 4,653,639 A | 3/1987 | Traynor |
| 4,688,715 A | 8/1987 | Barr |
| 4,690,322 A | 9/1987 | Burns |
| 4,706,878 A | 11/1987 | Lubotta et al. |
| 4,715,531 A | 12/1987 | Stewart et al. |
| 4,730,768 A | 3/1988 | Gendron |
| 4,775,095 A | 10/1988 | Emmott |
| 4,778,100 A | 10/1988 | McGuire et al. |
| 4,778,101 A | 10/1988 | Paquin |
| 4,815,654 A | 3/1989 | Buescher |
| 4,821,439 A | 4/1989 | Wilck |
| 4,878,613 A | 11/1989 | Badger et al. |
| 4,896,823 A | 1/1990 | Taylor |
| 4,899,926 A | 2/1990 | Spaulding |
| 4,917,287 A | 4/1990 | Watson |
| 4,927,072 A | 5/1990 | Jenkins et al. |
| 4,934,536 A | 6/1990 | Mills |
| 4,944,449 A | 7/1990 | Schmidt |
| 4,945,218 A | 7/1990 | Talbott |
| 4,960,237 A | 10/1990 | Bendel |
| 4,978,145 A | 12/1990 | Mikhail |
| 4,981,251 A | 1/1991 | Jenkins et al. |
| 4,993,624 A | 2/1991 | Schlich |
| 5,024,374 A | 6/1991 | Ashby |
| 5,025,980 A | 6/1991 | Blackman |
| 5,039,000 A | 8/1991 | Ashby |
| 5,040,720 A | 8/1991 | Pennock |
| 5,052,613 A | 10/1991 | Lin |
| 5,071,167 A | 12/1991 | O'Brien |
| 5,071,399 A | 12/1991 | Ashby |
| 5,098,130 A | 3/1992 | Mikhail |
| 5,104,036 A | 4/1992 | Rutkowski et al. |
| 5,110,043 A | 5/1992 | Ashby |
| 5,118,030 A | 6/1992 | Mcnamara et al. |
| 5,118,031 A | 6/1992 | Tighe |
| 5,125,562 A | 6/1992 | Bendel |
| 5,163,612 A | 11/1992 | Ashby |
| 5,197,663 A | 3/1993 | Stude |
| 5,201,464 A | 4/1993 | File |
| 5,209,698 A | 5/1993 | Dolan |
| 5,213,258 A | 5/1993 | Kim |
| 5,224,647 A | 7/1993 | Yanow |
| 5,232,150 A | 8/1993 | Solomons |
| 5,248,032 A | 9/1993 | Sheu et al. |
| 5,251,810 A | 10/1993 | Kim |
| 5,253,803 A | 10/1993 | Chess |
| 5,267,687 A | 12/1993 | Sherman |
| 5,271,553 A | 12/1993 | Kim |
| 5,277,362 A | 1/1994 | Wilson |
| 5,282,568 A | 2/1994 | File |
| 5,288,014 A | 2/1994 | Meyers et al. |
| 5,291,002 A | 3/1994 | Agnew et al. |
| 5,292,004 A | 3/1994 | Cesarini |
| 5,292,062 A | 3/1994 | Chess |
| 5,299,979 A | 4/1994 | Ballard |
| 5,307,989 A | 5/1994 | Dyer |
| 5,311,597 A | 5/1994 | Rosenbaum |
| 5,318,222 A | 6/1994 | Bartlett |
| 5,319,562 A | 6/1994 | Whitehouse |
| 5,324,927 A | 6/1994 | Williams |
| 5,333,909 A | 8/1994 | Hedge, Jr. |
| 5,341,505 A | 8/1994 | Whitehouse |
| 5,378,536 A | 1/1995 | Miller et al. |
| 5,383,686 A | 1/1995 | Laurash |

(56) References Cited

U.S. PATENT DOCUMENTS

| | | |
|---|---|---|
| 5,400,957 A | 3/1995 | Stude |
| 5,415,341 A | 5/1995 | Diamond |
| 5,420,403 A | 5/1995 | Allum et al. |
| 5,431,337 A | 7/1995 | Bell |
| 5,444,223 A | 8/1995 | Blama |
| 5,448,110 A | 9/1995 | Tuttle et al. |
| 5,458,273 A | 10/1995 | Schubert et al. |
| 5,487,566 A | 1/1996 | Hedge, Jr. |
| 5,487,826 A | 1/1996 | Back et al. |
| 5,493,106 A | 2/1996 | Hunter |
| 5,497,140 A | 3/1996 | Tuttle |
| 5,501,393 A | 3/1996 | Walz |
| 5,503,328 A | 4/1996 | Roccaforte et al. |
| 5,510,608 A | 4/1996 | Williams |
| 5,514,863 A | 5/1996 | Williams |
| 5,516,040 A | 5/1996 | Lin |
| 5,520,990 A | 5/1996 | Rotermund |
| 5,528,222 A | 6/1996 | Moskowitz et al. |
| 5,547,227 A | 8/1996 | Laurash et al. |
| 5,553,774 A | 9/1996 | Goodno |
| 5,554,842 A | 9/1996 | Connell et al. |
| 5,570,835 A | 11/1996 | Sung et al. |
| 5,612,889 A | 3/1997 | Pintsov et al. |
| 5,626,286 A | 5/1997 | Petkovsek |
| 5,626,370 A | 5/1997 | Petkovsek |
| 5,662,420 A | 9/1997 | Sinda et al. |
| 5,667,249 A | 9/1997 | Critelli |
| 5,683,029 A | 11/1997 | Lyons |
| 5,687,904 A | 11/1997 | Potter |
| 5,690,220 A | 11/1997 | Swan |
| 5,697,496 A | 12/1997 | Bauer |
| 5,703,783 A | 12/1997 | Allen et al. |
| 5,704,543 A | 1/1998 | Pollanen |
| 5,713,511 A | 2/1998 | Diamond |
| 5,722,538 A | 3/1998 | Neely et al. |
| 5,731,574 A | 3/1998 | Bodie et al. |
| 5,738,274 A | 4/1998 | Stude |
| 5,752,647 A | 5/1998 | Schubert et al. |
| 5,823,423 A | 10/1998 | Murray |
| 5,826,787 A | 10/1998 | Turner |
| 5,862,978 A | 1/1999 | Forrest |
| 5,875,964 A | 3/1999 | Pham |
| 5,887,780 A | 3/1999 | Popat et al. |
| 5,887,904 A | 3/1999 | Petkovsek |
| 5,901,843 A | 5/1999 | Garnbardella et al. |
| 5,901,844 A | 5/1999 | Gambardella et al. |
| 5,909,805 A | 6/1999 | Neely |
| 5,921,463 A | 7/1999 | Boyle et al. |
| 5,929,415 A | 7/1999 | Berson |
| 5,950,916 A | 9/1999 | Santangelo |
| 5,967,403 A | 10/1999 | Kranz |
| 6,005,945 A | 12/1999 | Whitehouse |
| 6,013,949 A | 1/2000 | Tuttle |
| 6,053,855 A | 4/2000 | Stenner |
| 6,059,316 A | 5/2000 | Whittington |
| 6,064,994 A | 5/2000 | Kubatzki et al. |
| 6,070,792 A | 6/2000 | Foushee |
| 6,129,269 A | 10/2000 | Tait |
| 6,129,389 A | 10/2000 | Younger |
| 6,130,613 A | 10/2000 | Eberhardt et al. |
| 6,155,481 A | 12/2000 | Rawlings |
| 6,170,879 B1 | 1/2001 | Rawlings |
| 6,173,888 B1 | 1/2001 | Fabel |
| 6,179,202 B1 | 1/2001 | Alexander et al. |
| 6,196,447 B1 | 3/2001 | Purcell et al. |
| 6,220,504 B1 | 4/2001 | Flynn et al. |
| 6,223,977 B1 | 5/2001 | Hill |
| 6,226,626 B1 | 5/2001 | Thiel |
| 6,227,443 B1 * | 5/2001 | Minato ............... B65D 27/06 229/305 |
| 6,237,844 B1 | 5/2001 | Purcell |
| 6,254,138 B1 | 7/2001 | Rawlings et al. |
| 6,282,525 B1 | 8/2001 | Kubatzki et al. |
| 6,296,179 B1 | 10/2001 | Wortman |
| 6,298,337 B1 | 10/2001 | Kubatzki et al. |
| D451,131 S | 11/2001 | Okah Chegwe-Akigbe |
| 6,343,736 B1 | 2/2002 | Kim |
| 6,361,077 B1 | 3/2002 | Petkovsek |
| 6,402,022 B1 | 6/2002 | Fabel |
| 6,409,075 B1 | 6/2002 | Mehta et al. |
| 6,415,983 B1 | 7/2002 | Ulvr et al. |
| 6,435,404 B1 | 8/2002 | Feick |
| 6,481,754 B2 | 11/2002 | Fabel |
| 6,491,160 B2 | 12/2002 | Butler et al. |
| 6,491,213 B2 | 12/2002 | Purcell |
| 6,532,452 B1 | 3/2003 | Pintsov et al. |
| 6,549,892 B1 | 4/2003 | Sansone |
| 6,557,755 B1 | 5/2003 | Pickering, Jr. et al. |
| 6,612,484 B2 | 9/2003 | Rawlings et al. |
| 6,613,998 B2 | 9/2003 | DeWitt et al. |
| 6,630,218 B1 | 10/2003 | Abe |
| 6,687,684 B1 | 2/2004 | Whitehouse et al. |
| 6,716,150 B2 | 4/2004 | Purcell |
| 6,725,587 B2 | 4/2004 | Collins |
| 6,741,178 B1 | 5/2004 | Tuttle |
| 6,795,813 B2 | 9/2004 | Allport et al. |
| 6,853,989 B2 | 2/2005 | Allport et al. |
| 6,865,561 B1 | 3/2005 | Allport et al. |
| 6,866,183 B2 | 3/2005 | Purcell |
| 6,886,001 B2 | 4/2005 | Allport et al. |
| D510,383 S | 10/2005 | Potter et al. |
| 6,966,484 B2 | 11/2005 | Calonje et al. |
| 6,978,583 B2 | 12/2005 | Rozenfeld |
| 6,983,875 B2 | 1/2006 | Emmott |
| 6,988,021 B2 | 1/2006 | Daniels, Jr. et al. |
| 6,998,558 B2 | 2/2006 | Forella et al. |
| 7,058,610 B1 | 6/2006 | Pintsov |
| 7,117,363 B2 | 10/2006 | Lincoln et al. |
| D536,375 S | 2/2007 | Potter et al. |
| 7,178,713 B2 | 2/2007 | Stude |
| 7,201,305 B1 | 4/2007 | Correa |
| 7,266,504 B1 | 9/2007 | Kara |
| 7,270,874 B2 | 9/2007 | Dalgleish |
| 7,333,936 B2 | 2/2008 | Holoubek |
| 7,350,689 B1 | 4/2008 | Campbell |
| 7,397,009 B2 | 7/2008 | O'Donohue et al. |
| 7,438,213 B2 | 10/2008 | Ackley et al. |
| 7,439,467 B2 | 10/2008 | DeWitt et al. |
| 7,457,760 B2 | 11/2008 | Harris et al. |
| 7,467,747 B2 | 12/2008 | Haas et al. |
| 7,469,816 B2 | 12/2008 | Rosenkranz et al. |
| 7,539,622 B1 | 5/2009 | Harris et al. |
| 7,549,571 B2 | 6/2009 | DeLaVergne |
| 7,559,471 B2 | 7/2009 | Lu et al. |
| 7,568,613 B1 | 8/2009 | Dillon et al. |
| D602,077 S | 10/2009 | Novack et al. |
| D602,078 S | 10/2009 | Novack et al. |
| 7,644,004 B2 | 1/2010 | Guyett et al. |
| 7,669,389 B2 | 3/2010 | Butler |
| 7,726,548 B2 | 6/2010 | DeLaVergne |
| 7,769,700 B1 | 8/2010 | D'Amico et al. |
| 7,775,420 B2 | 8/2010 | Emmott |
| 7,814,032 B2 | 10/2010 | Fitzsimmons |
| 7,815,099 B2 | 10/2010 | DeLaVergne |
| 7,818,268 B2 | 10/2010 | Fitzsimmons |
| 7,831,518 B2 | 11/2010 | Montgomery et al. |
| 7,831,524 B2 | 11/2010 | Whitehouse |
| 7,834,289 B2 | 11/2010 | Orbke et al. |
| 7,840,499 B2 | 11/2010 | Crutchfield |
| 7,844,553 B2 | 11/2010 | Whitehouse |
| 7,866,467 B2 | 1/2011 | Rosenkranz |
| 8,121,344 B2 | 2/2012 | O'Connell et al. |
| 8,191,763 B2 | 6/2012 | Delavergne |
| 8,245,933 B2 | 8/2012 | Isles et al. |
| 8,463,716 B2 | 6/2013 | Montgomery et al. |
| 8,598,482 B2 | 12/2013 | Bonnell et al. |
| 8,763,891 B1 | 7/2014 | DeLaVergne |
| 8,875,985 B1 | 11/2014 | DeLaVergne |
| 9,617,041 B1 * | 4/2017 | DeLaVergne .......... B65D 27/06 |
| 2001/0054082 A1 | 12/2001 | Rudolph et al. |
| 2002/0008135 A1 | 1/2002 | Kim |
| 2002/0023948 A1 | 2/2002 | Gillespie, IV |
| 2002/0030093 A1 | 3/2002 | Kim |
| 2002/0078663 A1 | 6/2002 | Kramer et al. |

(56) References Cited

U.S. PATENT DOCUMENTS

| | | |
|---|---|---|
| 2002/0130169 A1 | 9/2002 | Purcell |
| 2003/0015581 A1 | 1/2003 | Purcell |
| 2003/0101143 A1 | 5/2003 | Montgomery et al. |
| 2003/0182154 A1 | 9/2003 | Myers et al. |
| 2004/0050918 A1 | 3/2004 | DeLaVergne |
| 2004/0112946 A1 | 6/2004 | Smythe |
| 2004/0165748 A1 | 8/2004 | Bonner et al. |
| 2004/0215368 A1 | 10/2004 | Baker et al. |
| 2004/0217156 A1 | 11/2004 | Purcell |
| 2005/0018214 A1 | 1/2005 | DeWitt et al. |
| 2005/0025340 A1 | 2/2005 | Hickman |
| 2005/0045707 A1 | 3/2005 | Stude |
| 2005/0137991 A1 | 6/2005 | Bruce et al. |
| 2005/0184140 A1 | 8/2005 | DeLaVergne |
| 2005/0209977 A1 | 9/2005 | Avant et al. |
| 2005/0269416 A1 | 12/2005 | Sussmeier et al. |
| 2006/0113367 A1 | 6/2006 | Emmott |
| 2006/0113387 A1 | 6/2006 | Baker et al. |
| 2006/0131378 A1 | 6/2006 | Baker et al. |
| 2006/0208053 A1 | 9/2006 | Emmott |
| 2006/0219769 A1 | 10/2006 | DeLaVergne |
| 2006/0224403 A1 | 10/2006 | Whitehouse |
| 2006/0266808 A1 | 11/2006 | DeLaVergne |
| 2007/0038713 A1 | 2/2007 | Ryu |
| 2007/0129957 A1 | 6/2007 | Elliott et al. |
| 2007/0174213 A1 | 7/2007 | Whitehouse et al. |
| 2008/0041928 A1 | 2/2008 | DeLaVergne |
| 2009/0159509 A1 | 6/2009 | Wojdyla et al. |
| 2009/0287343 A1 | 11/2009 | Lee et al. |
| 2009/0287742 A1 | 11/2009 | Woolston et al. |
| 2009/0294338 A1 | 12/2009 | Lee et al. |
| 2009/0302099 A1 | 12/2009 | DeLaVergne |
| 2010/0038414 A1 | 2/2010 | DeLaVergne |
| 2010/0127490 A1 | 5/2010 | Novack et al. |
| 2010/0131378 A1 | 5/2010 | Novack et al. |
| 2010/0219233 A1 | 9/2010 | Rosen et al. |
| 2010/0292833 A1 | 11/2010 | Van Gorp et al. |
| 2010/0293111 A1 | 11/2010 | Van Gorp et al. |
| 2010/0312627 A1 | 12/2010 | Khechef et al. |
| 2011/0015935 A1 | 1/2011 | Montgomery et al. |
| 2011/0029429 A1 | 2/2011 | Whitehouse |
| 2011/0047100 A1 | 2/2011 | Wojdyla |
| 2011/0066549 A1 | 3/2011 | Whitehouse |
| 2011/0071665 A1 | 3/2011 | Brandt et al. |
| 2011/0082811 A1 | 4/2011 | Whitehouse |
| 2011/0114543 A1 | 5/2011 | Brandt |
| 2011/0122424 A1 | 5/2011 | Crutchfield |
| 2011/0130872 A1 | 6/2011 | Whitehouse |
| 2011/0161249 A1 | 6/2011 | Whitehouse |
| 2011/0161671 A1 | 6/2011 | Whitehouse |
| 2011/0242554 A1 | 10/2011 | Farry et al. |
| 2012/0066153 A1 | 3/2012 | Whitehouse |
| 2013/0066794 A1 | 3/2013 | Hill et al. |

FOREIGN PATENT DOCUMENTS

| | | |
|---|---|---|
| CH | 680124 A5 | 6/1992 |
| EP | 0230796 A1 | 8/1987 |
| EP | 0611056 A1 | 8/1994 |
| JP | 6-72446 A1 | 3/1994 |
| JP | 2000313449 A | 11/2000 |
| JP | 2001-122287 A1 | 5/2001 |
| WO | WO 9319991 A2 | 10/1993 |
| WO | WO 9621598 A1 | 7/1996 |
| WO | WO 0010885 A1 | 3/2000 |
| WO | WO 2004076296 A2 | 9/2004 |
| WO | WO 2007001193 A1 | 1/2007 |
| WO | WO 2007080395 A1 | 7/2007 |

\* cited by examiner

REUSABLE TOP FLAP ENVELOPE WITH DUAL OPPOSING SEAL FLAPS

CROSS REFERENCE TO RELATED APPLICATIONS

The present application claims the benefit of U.S. provisional patent application 62/234,401 filed Sep. 29, 2015, and claims the benefit of U.S. provisional patent application 62/170,128 filed Jun. 2, 2015, the teachings and entire contents which are incorporated herein by reference.

BACKGROUND OF THE INVENTION

1. Field of the Invention

Mail is an increasing driver of global commerce as more businesses connect physical mail to digital technology to improve its effectiveness. At the same time reusable envelopes are gaining traction and enhancing the value of mail. With the growth of reusable envelopes, operational challenges have emerged and reusable envelopes need to evolve. One of the primary challenges associated with reusable envelopes is that the majority of designs are bottom-flap envelopes. This is a significant challenge for mailers and Mail Service Providers (MSPs) that cannot re-orient their print stream to insert from the bottom. Seamless return processing remains a challenge as the reconfiguration of reusable envelopes may contain loose objects left over from the original outgoing mailing or contain return flaps that may catch in postal equipment or jam automated remit equipment.

The present invention relates to automation-compatible reusable envelopes that have dual seal flaps with an outbound top flap opening preferred by a majority of mailers, manufacturers, and automated insertion equipment, and which have a second seal flap for return on the bottom, enabling bi-directional mailing. In one manifestation, the present invention also provides automation-compatible reusable envelopes embedded in standard envelope layouts, having a security tab and/or bridge structure formed by removing a tear strip on the envelope, allowing access into the envelope. The return flap is formed by a person removing a unique flared tear strip that removes undesirable outgoing postal codes, and also forms a tapered return seal flap.

2. Description of the Related Art

Print mail offers significant advantages over digital content. People spend more time looking at printed material, and printed materials are tangible and more memorable. In addition, new technologies such as Augmented Reality (AR) take consumer engagement to new levels. In addition, postal mailboxes are not as cluttered, while the Web is increasingly cluttered. As a result, direct mail response rates considerably outperform digital channels. According to a recent study, the response rate for direct mail averages at 3.7% with an in-house list, ahead of Mobile at 0.2% and email response rates of just 0.1%.

Furthermore, payments industry executives acknowledge the use of mobile payment systems increase the risk of suffering a data breach. According to a 2014 "Retail's Reality" study, 44% of all consumers surveyed have had personal information stolen through a data breach, while 60% of consumers aged 18 to 24 years reported that they are cybercrime victims. Major corporations are recommending customers review account statements to guard against scam electronic communications that appear to originate from the company and suggest customers DO NOT reply to the email or reach out to the senders in any way, DO NOT supply any information on the website that may open, and DO NOT open any attachments that arrive with email. The result is an increased confidence in and preference for print communications involving confidential information. Consequently, there still remain a large contingent of the population that either prefer a tangible paper copy, or who use the paper to store important information complimentary to electronic storage. Printed material is also critical for reminders for bill payment and medication.

Modern mail pieces offer many features that are advantageous, and in some cases completely unavailable through competing technologies. Mail pieces elicit several senses in the recipient, by not only being visually engaging, but also by being tangible and tactile. In some instances, the mail may also be interactive, such as through reusable features or Augmented Reality (AR). AR allows a person with a smartphone or tablet to 'transform' a printed advertisement, or still image, into a live 3D video experience by pointing a camera at the printed document. Furthermore, modern micro-encapsulation technology allows a mail piece to be provided with a distinct scent or smell. In addition, other tangible objects may be delivered within a single mail piece, using the envelope as a delivery vehicle. Examples of this are delivery of samples of product, such as pens, fabric swatches, air fresheners, and other diverse goods with a printed order or re-order form. In the case of high-value product samples and the like, these samples are desirably returned.

The result today is that mail has continued to evolve as a compelling, engaging, and tactile communication device that elicits higher opening and response rates and complements alternative media. Revenue generation, the lifeblood of any business, and corresponding response rates to mail pieces are both typically substantially higher than obtained through other media. Moreover, print mail is a sustainable choice for communication when responsibly manufactured with materials from managed forests, recycled content and new agricultural waste. Furthermore, print mail can be reusable as taught by the present invention, and when not reused, may also be recycled. Simply, mail remains an important, economically productive, and vital communication channel.

The mail piece includes an envelope that provides addressing and postage information, and also provides a protective and often concealing jacket about any documents contained therein. The added layer of protection provided by the envelope can be vital to protect confidentiality in the event of a minor mishap by the courier, such as the inadvertent dropping of the mail piece, inadvertent exposure to the elements, undesirable snagging or other negative interaction with automated mail handling machinery, and other mishap.

Many business mail pieces also require or prefer a reply. For exemplary purposes only, this may be in the form of a remittance or an order. Direct mail and mail that is returned for paying a bill or responding to a solicitation includes what is referred to as a reply envelope. The typical reply envelope is a No. 9 envelope which is approximately 3.875 inches high and has a tapered return flap. Because there is a general conformity for the standard reply envelope size and construction design, companies responsible for collecting and processing the return mail optimize their machines to this standard for speed and accuracy. Similarly, the outgoing mail machinery is also optimized for standard sizes, construction, and seal flap design. Sizes and designs outside the standard size are either unable to be processed through automated equipment or can slow the automated process down, costing companies extra money in processing envelopes and sometimes delaying payment from the customer. Thus larger envelopes used for the outgoing mailing are not feasible for remittance and a smaller reply size and contour seal flaps help ensure seamless and automated remittance processing and on-time banking, payment, and orders.

A reply envelope is added to most business mail that desires a return or reply, but the reply envelope is redundant, only needed for return mailing. It adds costs because it is a separate envelope that needs to be manufactured, printed, shipped, stored, and inserted. Generally when a customer sends a payment for a bill or invoice by mail, a donation to a nonprofit, a membership renewal, or other response, they send a return coupon with personal information and an associated response or check in the reply envelope. A larger envelope that can carry multiple pages on the outgoing mailing is not required for the return when a single reply or check and coupon are returned. For this purpose a smaller envelope is both less expensive and sufficient. In addition, a smaller reply envelope fits the optimal size requirements for remittance equipment, allowing the most efficiencies and cost savings for returned mail. A standard outgoing letter size envelope in the United States is a #10 envelope, and a standard letter size reply envelope is a #9 envelope.

Standard envelope designs incorporate flaps that are tapered, having either a curved or 'v' shape. This is largely a function of insertion and remittance equipment preferences. However, in USPS processing and in the remittance process we have learned that while a square return flap common on reusable envelopes may be operable, it may slow processing and jam equipment. As a result, a contour flap is preferred for return processing.

Just as with other industries, automation has lowered costs of high volume and labor intensive operations, while providing increased reliability and clear failure when a machine malfunctions or ceases to work. In the mailing industry, various types of machines have gained wide-spread use in the production, insertion, and handling of mail pieces.

Automated insertion equipment allows high volumes of documents to be assembled into envelopes and mailed to many recipients. Insertion machines, for exemplary purpose, have increased insertion speeds and continue to race to ever-higher speeds. Today, some of the fastest inserters process as many as 32,000 letters per hour, or more than 500 letters per minute. Compatibility with automated handling equipment therefore ensures lower mail processing costs.

In spite of the many advantages provided by modern envelopes, some of the limitations of a mail piece can also emanate from the envelope. As noted above, when a statement or a direct mail is received, the mailing will often contain a reply envelope for the recipient to return payment, purchase a subscription or other product marketed through the mail, or otherwise reply. This undesirably increases the cost, volume, and weight of mail.

As may be apparent, manufacturing, printing, storing, and inserting a second reply envelope costs additional money for mailers. One of the notable costs is the required dedication of an additional hopper on insertion machinery to this task.

In addition, the extra weight of a second reply envelope can tip the postage scale to a higher rate, thereby adding significant cost to a mailing. This is particularly true for very high volume mailings, where the extra postage per mail piece is multiplied by the high quantities being mailed.

Furthermore, the additional volume of a second reply envelope can be an issue, since the mail piece must not clog the very equipment the envelope is designed to work with. This means that the mail pieces must still remain thin enough to pass through the equipment, and also not rupture with the stress on the envelope that the extra volume creates.

Rather than inserting a reply envelope, the mailer could instead allocate inserting equipment to insert additional sales and marketing material capable of generating incremental revenue. The weight and volume of the reply envelope is then replaced by advertising that offsets mailing costs and generates revenue. Consequently, a single two-way reusable envelope is not only better for the environment by requiring less material consumption, logistics, and handling, in some situations it can also offer substantial economic advantage over the traditional separate outgoing and reply envelope pair.

While reusable envelopes offer much benefit, they are not without drawback. Even with many years of innovation in the industry, many high-speed machinable reusable envelopes require a flap at the bottom for insertion that is used to obscure but not remove postal barcodes, such as by relocating the barcode to the back of the envelope. In contrast, most high-speed machinery and manufacturers either require or prefer a top flap envelope for insertion that does not require mailers to re-orient their print stream to insert from the bottom. Furthermore, postal processing equipment has been modified to read barcodes printed in any location on both the face and back of an envelope. If there is no FIM and barcode in either the window or on the face of an envelope, postal processing equipment will find the relocated barcode on the back of the envelope and the reply mailpiece will undesirably be returned to the customer instead of to the business.

Some prior reusable envelopes also apply a return flap over the original or outgoing flap to cover printed barcodes. This may leave a portion of the original flap not secured to the envelope and increases the thickness of the envelope, which can in turn interfere with automated machinery and require equipment adjustments for some or all of their remitted mail, adding time and cost to the processing. Other challenges associated with the prior art include necessary features such as an extended throat, dual gum lines, and multiple perforations that may undesirably bend during insertion. These necessary components of prior art may slow insertion, jam equipment, require equipment adjustments, add instability to the flap area and threaten overspray on the re-seal gum line, threatening the ability of the envelope to be re-used.

Some prior art reusable envelopes remove all or a part of the original outgoing flap. This will in many cases damage and compromise the envelope. Further, other designs that avoid damaging the envelope remove major portions of the outgoing envelope, undesirably diminishing the available size of the envelope for return mailing. In addition, and often directly related thereto, many of the prior art envelopes require substantial perforations on both the front and back of the envelope to functionally detach sections of the envelope. Not only does this lead to much loss of return envelope size and capacity, but these perforations in some designs can also weaken and thereby compromise the envelope undesirably.

A large number of patents and published patent application documents from the United States and other countries are illustrative of the prior art described herein above, the teachings and contents of each which are incorporated herein by reference, including: U.S. Pat. No. 192,522 by Marshall, entitled "Envelopes"; U.S. Pat. No. 460,472 by Hitt, entitled "Envelope book"; U.S. Pat. No. 759,382 by Klugh, entitled "Mailing envelop"; U.S. Pat. No. 886,449 by West, entitled "Return envelope"; U.S. Pat. No. 932,715 by Morrison, entitled "Return envelope"; U.S. Pat. No. 1,145,935 by Steinke, entitled "Return reply envelop"; U.S. Pat. No. 1,187,258 by Carr et al, entitled "Envelop"; U.S. Pat. No. 1,173,869 by Rougeux, entitled "Safety envelop"; U.S. Pat. No. 1,245,447 by Felenchak, entitled "Mailing envelop"; U.S. Pat. No. 1,438,122 by McCoy, entitled "Return envelope"; U.S. Pat. No. 1,953,192 by Rossiter, entitled "Two-way envelope"; U.S. Pat. No. 1,957,704 by Drachman, entitled "Envelope"; U.S. Pat. No. 1,960,054 by Johnson, entitled "Letter sheet"; U.S. Pat. No. 1,988,908 by MacKinnon, entitled "Mail covering"; U.S. Pat. No. 2,007,625 by Walters, entitled "Gummed tear strip"; U.S. Pat. No. 2,129,705 by Reineman, entitled "Envelope"; U.S. Pat. No. 2,201,538 by Holden, entitled "Envelope"; U.S. Pat. No. 2,310,371 by Lines et al, entitled "Photographic material containing envelope"; U.S. Pat. No. 2,340,700 by Sawdon, entitled "Multiform envelope"; U.S. Pat. No. 2,350,100 by Deutschmeister et al, entitled "Mailing device"; U.S. Pat. No. 2,363,957 by Goff, entitled "Envelope or container"; U.S. Pat. No. 2,400,406 by Godoy, entitled "Closure for envelopes and the like"; 2,417,982 by Histed, entitled "Greeting card"; 2,835,512 by Whitman, entitled "Banking envelope"; U.S. Pat. No. 2,928,583 by Law, entitled "Envelope"; U.S. Pat. No. 2,941,711 by Biek, entitled "Window envelope and addressed filler sheet assembly"; U.S. Pat. No. 2,954,154 by Mooney, entitled "Combination circular and envelope"; U.S. Pat. No. 3,011,691 by McGlynn et al, entitled "Envelope"; U.S. Pat. No. 3,062,431 by Rabenold, entitled "Envelope"; U.S. Pat. No. 3,073,509 by Schuessler, entitled "Mailing unit"; U.S. Pat. No. 3,086,695 by Lillibridge, entitled "Envelope"; U.S. Pat. No. 3,111,257 by Peach, entitled "Returnable billing envelope"; U.S. Pat. No. 3,111,336 by Schumacher, entitled "Convertible billing envelope with carbons for preparing statement and customer's address in duplicate"; U.S. Pat. No. 3,113,716 by Howard, entitled "Mailing device"; U.S. Pat. No. 3,152,751 by Hiersteiner, entitled "Two-way envelope and enclosure combination"; U.S. Pat. No. 3,167,243 by Wiley, entitled "Return envelope"; U.S. Pat. No. 3,184,150 by Hubbard, entitled "Multiple purpose mailing piece"; U.S. Pat. No. 3,227,360 by Krueger, entitled "Two-way envelope"; U.S. Pat. No. 3,259,304 by Tichnor, entitled "Postcards"; U.S. Pat. No. 3,261,623 by Kiedrowski, entitled "Envelope"; U.S. Pat. No. 3,276,669 by Vilutis, entitled "Package and method of making same"; U.S. Pat. No. 3,278,015 by Bernstein, entitled "Combination envelope and display device"; U.S. Pat. No. 3,330,581 by Ivarsson-Wallerstrom, entitled "Set of blanks"; U.S. Pat. No. 3,374,940 by Allison, entitled "Envelopes with integral, detachable coupons contained therein"; U.S. Pat. No. 3,380,648 by De Lyra, entitled "Reusable envelope"; U.S. Pat. No. 3,411,699 by Pine et al, entitled "Multiple use envelope assembly"; U.S. Pat. No. 3,426,961 by Allison, entitled "One-piece perforated enclosed coupon envelope"; U.S. Pat. No. 3,472,444 by Aliff, Jr et al, entitled "Two-way mailer envelope"; U.S. Pat. No. 3,498,528 by Klein, entitled "Remailable envelope"; U.S. Pat. No. 3,507,444 by Werby, entitled "Packing list envelope"; U.S. Pat. No. 3,525,469 by Sawdon, entitled "Multiform envelopes"; U.S. Pat. No. 3,531,046 by Carrigan, entitled "Destructible envelope with detachable built-in return envelope"; U.S. Pat. No. 3,537,637 by Hiersteiner, entitled "Envelope with removable identification label"; U.S. Pat. No. 3,545,669 by Kinkade et al, entitled "Envelope construction"; U.S. Pat. No. 3,652,007 by MacDougall, entitled "Two-way mailing envelope"; U.S. Pat. No. 3,653,585 by Kazaros, entitled "Container with tear-type opener"; U.S. Pat. No. 3,693,869 by Eaves, Jr., entitled "Remailable mailing envelope"; U.S. Pat. No. 3,718,277 by Volkert, entitled "Printed folder including mailable article"; U.S. Pat. No. 3,747,837 by Wilson, entitled "Mailing and return envelope"; U.S. Pat. No. 3,802,618 by Wiessner, entitled "Send and return envelope"; U.S. Pat. No. 3,822,492 by Crawley, entitled "Removable reusable labels"; U.S. Pat. No. 3,874,582 by Wang, entitled "Reusable envelope"; U.S. Pat. No. 3,899,127 by Melander, entitled "Article for postal conveyance, especially one allowing for a reply"; U.S. Pat. No. 3,910,410 by Shaw, entitled "Resealable package"; U.S. Pat. No. 3,941,309 by Gendron, entitled "Combined brochure and return envelope package"; U.S. Pat. No. 3,946,938 by Kranz, entitled "Two piece mailer"; U.S. Pat. No. 3,979,051 by Close, entitled "Multi-compartment envelope"; U.S. Pat. No. 3,982,689 by Retrum, entitled "Returnable mailing envelope"; U.S. Pat. No. 4,072,264 by Kranz, entitled "Duplex mailing envelope"; U.S. Pat. No. 4,084,694 by Lainez et al, entitled "Container for video discs"; U.S. Pat. No. 4,157,759 by Dicker, entitled "Continuous mailer"; U.S. Pat. No. 4,159,129 by Lockhart, entitled "Pharmaceutical record and label system"; U.S. Pat. No. 4,180,168 by Hiersteiner, entitled "Two-way envelope"; U.S. Pat. No. 4,190,161 by Gendron, entitled "Compartmented envelope"; U.S. Pat. No. 4,190,162 by Buescher, entitled "Stationery having snap-open envelope with remailable portion"; U.S. Pat. No. 4,194,631 by Rangan, entitled "Machine sortable mailing envelope"; U.S. Pat. No. 4,245,775 by Conn, entitled "Two-way postal card and envelope"; U.S. Pat. No. 4,288,028 by Diaz, entitled "Remailable envelope"; U.S. Pat. No. 4,308,987 by Solomon, entitled "Remailable envelope"; U.S. Pat. No. 4,332,346 by Kronman, entitled "Two-way envelope"; U.S. Pat. No. 4,334,618 by Buescher, entitled "Stationery having snap-open envelope with remailable portion"; U.S. Pat. No. 4,354,631 by Stevenson, entitled "Resealable envelope"; U.S. Pat. No. 4,379,573 by Lomeli et al, entitled "Business form with removable label and method for producing the same"; U.S. Pat. No. 4,382,539 by Kronman, entitled "Two-way envelopes with return flap positioning means and method"; U.S. Pat. No. 4,384,670 by Dicker, entitled "Peel back mailer"; U.S. Pat. No. 4,403,696 by Newell, entitled "Envelope"; U.S. Pat. No. 4,436,202 by Berkley, entitled "Reusable envelope"; U.S. Pat. No. 4,445,635 by Barr, entitled "Two way mailing envelope"; U.S. Pat. No. 4,487,360 by Fisher et al, entitled "Two way envelope"; U.S. Pat. No. 4,538,833 by Trikilis, entitled "Publication"; U.S. Pat. No. 4,549,658 by Sfikas, entitled "Mini disk holder"; U.S. Pat. No. 4,565,317 by Kranz, entitled "Two-way envelope with inside return seal flap"; U.S. Pat. No. 4,570,416 by Shoenfeld, entitled "Overnight package"; U.S. Pat. No. 4,586,611 by Scalzo, entitled "Business mailer"; U.S. Pat. No. 4,602,736 by Barr, entitled "Two-way mailing envelope"; U.S. Pat. No. 4,613,157 by Drabish, entitled "Reusable greeting card"; U.S. Pat. No. 4,620,630 by Moss, entitled "Compact disc in convertible enclosure"; U.S. Pat. No. 4,640,030 by Wood et al, entitled "Combination envelope and display device"; U.S. Pat. No. 4,651,920 by Stenner, entitled "Direct mail article with reply envelope and detachable reply devices visible within reply envelope"; U.S. Pat. No. 4,653,639 by Traynor, entitled "Envelope for magnetic disks and jackets"; U.S. Pat. No. 4,688,715 by Barr, entitled "Two-way mailing envelope and method of making and addressing the same"; U.S. Pat. No. 4,690,322 by Burns, entitled "Resealable envelope"; U.S. Pat. No. 4,706,878 by Lubotta et al, entitled "Self-mailer envelope"; U.S. Pat. No. 4,715,531 by Stewart et al, entitled "Reusable remailable envelope"; U.S. Pat. No. 4,730,768 by Gendron, entitled "Remailable envelope"; U.S. Pat. No. 4,775,095 by Emmott, entitled "Remailable envelope"; U.S. Pat. No. 4,778,100 by McGuire et al, entitled "Direct-mail advertising package with acceptance form and return mailer envelope"; U.S. Pat. No. 4,778,101 by Paquin, entitled "Two-way envelope"; U.S. Pat. No. 4,815,654 by Buescher, entitled "Envelope having a remailable portion"; U.S. Pat. No. 4,821,439 by Wilck, entitled "Composite label"; U.S. Pat. No. 4,878,613 by Badger et al, entitled "Envelope for table top laser printer"; U.S. Pat. No. 4,896,823 by Taylor, entitled "Mailer with return envelope"; U.S. Pat. No. 4,899,926 by Spaulding, entitled "Two way mailer"; U.S. Pat. No. 4,917,287 by Watson, entitled "Reversible envelope"; U.S. Pat. No. 4,927,072 by Jenkins et al, entitled "Mailer"; U.S. Pat. No. 4,934,536 by Mills, entitled "Envelope assembly"; U.S. Pat. No. 4,944,449 by Schmidt, entitled "Oversize laser mailer and return envelope and method"; U.S. Pat. No. 4,945,218 by Talbott, entitled "Mailing device and machine-readable business card"; U.S. Pat. No. 4,960,237 by Bendel, entitled "Self-contained insert mailer"; U.S. Pat. No. 4,981,251 by Jenkins et al, entitled "Mailer"; U.S. Pat. No. 4,993,624 by Schlich, entitled "Two-way bar code window envelope"; U.S. Pat. No. 5,024,374 by Ashby, entitled "Flyless mailer having top sheet with cutout"; U.S. Pat. No. 5,025,980 by Blackman, entitled "Double use express mail envelope"; U.S. Pat. No. 5,039,000 by Ashby, entitled "Mailer with tear strip on outgoing and return envelopes"; U.S. Pat. No. 5,040,720 by Pennock, entitled "Return envelope mailer"; U.S. Pat. No. 5,052,613 by Lin, entitled "Two-way envelope"; U.S. Pat. No. 5,071,167 by O'Brien, entitled "Shipping and return mailing label"; U.S. Pat. No. 5,071,399 by Ashby, entitled "Method of making a mailer with tear strip on outgoing and return envelopes"; U.S. Pat. No. 5,104,036 by Rutkowski et al, entitled "Mailer with reply envelope"; U.S. Pat. No. 5,110,043 by Ashby, entitled "Return mailer without fly sheet"; U.S. Pat. No. 5,118,030 by McNamara et al, entitled "Mailer with perforated adhesive areas"; U.S. Pat. No. 5,118,031 by Tighe, entitled "Remailable postcard card"; U.S. Pat. No. 5,125,562 by Bendel, entitled "Multi-panel mailer"; U.S. Pat. No. 5,163,612 by Ashby, entitled "Method of making a mailer with tear strip on outgoing and return envelopes"; U.S. Pat. No. 5,197,663 by Stude, entitled "Reusable mailing envelope"; U.S. Pat. No. 5,201,464 by File, entitled "Pressure seal C-fold two-way mailer"; U.S. Pat. No. 5,209,698 by Dolan, entitled "Piggyback label with CF or self-contained coating"; U.S. Pat. No. 5,213,258 by Kim, entitled "Resealable, returnable envelope"; U.S. Pat. No. 5,224,647 by Yanow, entitled "Remailable envelope"; U.S. Pat. No. 5,232,150 by Solomons, entitled "Two way envelope for automated initial use"; U.S. Pat. No. 5,248,032 by Sheu et al, entitled "Compact disc jacket"; U.S. Pat. No. 5,251,810 by Kim, entitled "Re-mailable envelope with double side addressing window"; U.S. Pat. No. 5,253,803 by Chess, entitled "Reusable mailer"; U.S. Pat. No. 5,267,687 by Sherman, entitled "Two way mailer"; U.S. Pat. No. 5,271,553 by Kim, entitled "Re-mailable envelope with removable addressing sheet"; U.S. Pat. No. 5,277,362 by Wilson, entitled "Reusable envelope"; U.S. Pat. No. 5,282,568 by File, entitled "Reuseable mailer meeting postal requirements"; U.S. Pat. No. 5,288,014 by Meyers et al, entitled "Two-way mailer"; U.S. Pat. No. 5,292,062 by Chess, entitled "Reusable mailer"; U.S. Pat. No. 5,299,979 by Ballard, entitled "Shipping form with label"; U.S. Pat. No. 5,307,989 by Dyer, entitled "Two way mailer with external 'insert'"; U.S. Pat. No. 5,318,222 by Bartlett, entitled "Mailer for computer disks"; U.S. Pat. No. 5,324,927 by Williams, entitled "Return mail piece and method of marking the same"; U.S. Pat. No. 5,333,909 by Hedge, entitled "Promotional advertising brochure including reusable envelope device"; U.S. Pat. No. 5,383,686 by Laurash, entitled "Label for operation control system"; U.S. Pat. No. 5,400,957 by Stude, entitled "Reusable envelope"; U.S. Pat. No. 5,415,341 by Diamond, entitled "Business envelope"; U.S. Pat. No. 5,431,337 by Bell, entitled "Reply mail envelope"; U.S. Pat. No. 5,458,273 by Schubert et al, entitled "Mailer assembly"; U.S. Pat. No. 5,487,566 by Hedge, entitled "Promotional advertising brochure including reusable envelope device"; U.S. Pat. No. 5,487,826 by Back et al, entitled "Cardboard mailer packages"; U.S. Pat. No. 5,501,393 by Walz, entitled "Mailing form"; U.S. Pat. No. 5,503,328 by Roccaforte et al, entitled "Multi-use envelope"; U.S. Pat. No. 5,510,608 by Williams, entitled "Return mail piece and method of marking the same"; U.S. Pat. No. 5,514,863 by Williams, entitled "Return mail piece and method of marking the same"; U.S. Pat. No. 5,516,040 by Lin, entitled "Two way mailing envelopes"; U.S. Pat. No. 5,520,990 by Rotermund, entitled "Shipping label"; U.S. Pat. No. 5,547,227 by Laurash et al, entitled "Laminated label form with removable portions"; U.S. Pat. No. 5,553,774 by Goodno, entitled "Pressure seal C-folded mailer"; U.S. Pat. No. 5,570,835 by Sung et al, entitled "Self-reply envelope"; U.S. Pat. No. 5,626,286 by Petkovsek, entitled "One-piece special service mailing assembly with flapless sealing and a method for forming a unitary mailpiece"; U.S. Pat. No. 5,626,370 by Petkovsek, entitled "One-piece special service mailing form and return envelope and a method for assembling same"; U.S. Pat. No. 5,662,420 by Sinda et al, entitled "Cushioned macerated paper dispatch package"; U.S. Pat. No. 5,683,029 by Lyons, entitled "Combination sealing and opening strip for packages"; U.S. Pat. No. 5,687,904 by Potter, entitled "Envelope and a blank for making an envelope"; U.S. Pat. No. 5,690,220 by Swan, entitled "Packaging arrangement for display and storage of compact disks"; U.S. Pat. No. 5,697,496 by Bauer, entitled "Package for compact disks or computer diskettes"; U.S. Pat. No. 5,704,543 by Pollanen, entitled "Window-envelope"; U.S. Pat. No. 5,713,511 by Diamond, entitled "Multi-purpose envelope"; U.S. Pat. No. 5,722,538 by Neely et al, entitled "Label assembly for package sleeve accommodating a storage media disc and method for sealing a package sleeve"; U.S. Pat. No. 5,738,274 by Stude, entitled "Reusable reply envelope"; U.S. Pat. No. 5,752,647 by Schubert et al, entitled "Envelope intermediate with integral mail-back piece"; U.S. Pat. No. 5,823,423 by Murray, entitled "Envelope"; U.S. Pat. No. 5,826,787 by Turner, entitled "Two-way mailer envelope"; U.S. Pat. No. 5,862,978 by Forrest, entitled "Certified mailer envelope assembly"; U.S. Pat. No. 5,875,964 by Pham, entitled "Reusable business envelope"; U.S. Pat. No. 5,887,780 by Popat et al, entitled "Computer printable dual No. 10 envelope assembly"; U.S. Pat. No. 5,887,904 by Petkovsek, entitled "Integral special service mailing assembly with a frozen label portion and a method for using same"; U.S. Pat. No. 5,901,843 by Gambardella et al, entitled "Display package"; U.S. Pat. No. 5,901,844 by Gambardella et al, entitled "Display package"; U.S. Pat. No. 5,909,805 by Neely, entitled "Label assembly for package sleeve accommodating a storage media disc and method for sealing a package sleeve"; U.S. Pat. No. 5,929,415 by Berson, entitled "Postage metering refill system that utilizes information contained in information based indicia to audit the franking process"; U.S. Pat. No. 5,950,916 by Santangelo, entitled "Security envelope"; U.S. Pat. No.

5,967,403 by Kranz, entitled "Remailable envelope and method for making a remailable envelope from a single blank"; U.S. Pat. No. 6,053,855 by Stenner, entitled "Direct mail article with cover and one or more interior sheets and integral business reply envelope"; U.S. Pat. No. 6,059,316 by Whittington, entitled "Product carrying insert book having bound insert and method of forming a book"; U.S. Pat. No. 6,070,792 by Foushee, entitled "Reusable envelope"; U.S. Pat. No. 6,129,269 by Tait, entitled "Easy-opening reusable envelopes"; U.S. Pat. No. 6,129,389 by Younger, entitled "Self mailer with return envelope formed from a single cut sheet"; U.S. Pat. No. 6,155,481 by Rawlings, entitled "Returnable mailer"; U.S. Pat. No. 6,170,879 by Rawlings, entitled "Returnable shipping label"; U.S. Pat. No. 6,173,888 by Fabel, entitled "Mailing form for non-impact printing"; U.S. Pat. No. 6,179,202 by Alexander et al, entitled "Single side imaged special services mailer"; U.S. Pat. No. 6,196,447 by Purcell et al, entitled "Envelope with outside coupon flap"; U.S. Pat. No. 6,220,504 by Flynn et al, entitled "Envelope with a removable panel"; U.S. Pat. No. 6,223,977 by Hill, entitled "Easy open envelope"; U.S. Pat. No. 6,237,844 by Purcell, entitled "Inside bangtail envelope"; U.S. Pat. No. 6,254,138 by Rawlings et al, entitled "Semi-transparent label laminate"; U.S. Pat. No. 6,296,179 by Wortman, entitled "Inside out two-way shipping envelope"; U.S. Pat. No. 6,343,736 by Kim, entitled "Reusable mailing envelope with tear-strip opening device"; U.S. Pat. No. 6,361,077 by Petkovsek, entitled "Label and/or form for special service mailing and a method of assembling a mailpiece requiring special mailing services"; U.S. Pat. No. 6,402,022 by Fabel, entitled "Mailing form for non-impact printing"; U.S. Pat. No. 6,409,075 by Mehta et al, entitled "Mailer intermediate"; U.S. Pat. No. 6,435,404 by Feick, entitled "Return mailer"; U.S. Pat. No. 6,481,754 by Fabel, entitled "Machine sealable mailing form for non-impact printing"; U.S. Pat. No. 6,491,160 by Butler et al, entitled "Tri-fold protective mailer for stress-sensitive articles"; U.S. Pat. No. 6,491,213 by Purcell, entitled "Easy open envelope"; U.S. Pat. No. 6,612,484 by Rawlings et al, entitled "Duplex envelope"; U.S. Pat. No. 6,725,587 by Collins, entitled "Combination envelope and greeting card"; U.S. Pat. No. 6,966,484 by Calonje et al, entitled "Mailing and response envelope"; U.S. Pat. No. 6,978,583 by Rozenfeld, entitled "High speed vacuum system for inserters"; U.S. Pat. No. 6,983,875 by Emmott, entitled "Apparatus for fastening and separating containers"; U.S. Pat. No. 7,178,713 by Stude, entitled "Easy open envelope"; U.S. Pat. No. 7,201,305 by Correa, entitled "Postal outgoing and reply envelope form system"; U.S. Pat. No. 7,350,689 by Campbell, entitled "Reusable tamper evident envelope"; U.S. Pat. No. 7,438,213 by Ackley et al, entitled "Voting ballot envelope"; U.S. Pat. No. 7,467,747 by Haas et al, entitled "Method and system for protecting privacy of signatures on mail ballots"; U.S. Pat. No. 7,469,816 by Rosenkranz et al, entitled "Digital media mailer"; U.S. Pat. No. 7,549,571 by DeLaVergne, entitled "Environmentally friendly reusable envelope structures"; U.S. Pat. No. 7,568,613 by Dillon et al, entitled "Mailer envelope with inventory control window"; U.S. Pat. No. 7,644,004 by Guyett et al, entitled "Automated mail creation and processing system"; U.S. Pat. No. 7,669,389 by Butler, entitled "Two-way postal mailing assembly"; U.S. Pat. No. 7,726,548 by DeLaVergne, entitled "Reusable envelope structures and methods"; U.S. Pat. No. 7,775,420 by Emmott, entitled "Apparatus and methods for reusing a mailer"; U.S. Pat. No. 7,815,099 by DeLaVergne, entitled "Reusable envelope structures and methods"; U.S. Pat. No. 7,866,467 by Rosenkranz, entitled "Digital media envelope sleeve with identification markings"; U.S. Pat. No. 8,191,763 by DeLaVergne, entitled "Reusable envelopes"; U.S. Pat. No. 8,763,891 by DeLaVergne, entitled "Reusable envelope structures and methods"; U.S. Pat. No. 8,875,985 by DeLa Vergne, entitled "Conversion envelopes"; Des 451,131 by Okah Chegwe-Akigbe, entitled "General purpose envelope"; Des 510,383 by Potter et al, entitled "Two-way disc mailer"; Des 536,375 by Potter et al, entitled "Disc mailer"; 2002/0008135 by Kim; 2002/0023948 by Gillespie, IV; 2002/0030093 by Kim; 2002/0130169 by Purcell; 2003/0015581 by Purcell; 2004/0050918 by DeLaVergne; 2004/0112946 by Smythe; 2004/0217156 by Purcell; 2005/0045707 by Stude; 2005/0184140 by DeLaVergne; 2006/0113367 by Emmott; 2006/0208053 by Emmott; 2006/0219769 by DeLaVergne; 2006/0266808 by DeLaVergne; 2008/0041928 by DeLaVergne; 2009/0302099 by DeLaVergne; 2010/0038414 by DeLaVergne; 2010/0219233 by Rosen et al; CA 2075214 by Coffey; CA 2138361 by Turner; CH 680124 by Glarner; EP 0230796 by Pascal et al; EP 0611056 by Loch et al; JP 6-72446 by Tsuneo; JP 2000313449 by Masaharu; JP 2001-122287 by Masanori; WO 9319991 by Husnu; WO 9621598 by Martin et al; WO 0010885 by Emmott; WO 2004076296 by Emmott; WO 2007001193 by Smythe; and WO 2007080395 by Care.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

Accordingly, the present invention provides automation-compatible reusable envelopes that have an outbound top flap opening preferred for insertion by a majority of mailers, and which have a bottom opening tear strip and return flap. These envelopes retain the original outgoing seal flap, which remains secured to the envelope on the top, thereby ensuring integrity of the envelope. In addition, the separate opening and return seal flap features on the bottom of the envelope remove postal bar codes rather than obscuring them, while also optimizing the size of the return envelope.

According to the present invention, only one envelope is required for both sending and returning, instead of one large envelope and a second smaller envelope inserted within the larger envelope. The envelope, for exemplary purposes only and not limiting the present invention solely thereto, may be designed as a standard larger size envelope such as the US #10 for sending the mail and a smaller size envelope resembling a US #9 for remittance, or any other envelopes that are functionally combined into a single envelope. Nevertheless, this unique design can be applied to all sizes of envelopes compatible with automation equipment and is not limited to any particular size of envelope. An outgoing envelope with a top flap that remains securely affixed to the envelope and utilizes a bottom flap for return in accordance with the present invention eliminates a costly, time-consuming and, in some situations, prohibitive requirement to re-orient the print stream to insert from the bottom. This enables automated insertion, postal, and remittance processing, saving money, preserves natural resources, and is a unique, functional, and effective way to send statements, surveys, and direct mail that require return mailing.

Additionally, envelopes in accordance with the present invention include a simple method for completely removing barcodes commonly sprayed on the envelope. The sprayed postal barcode (USPS) in the "barcode clear zone" on the face of the envelope is the key determinant to where a mailpiece is delivered, and is used throughout postal processing and routing. By removing an opening strip on the lower portion of the envelope, postal delivery barcodes that may have been applied during outbound mailing can be completely removed prior to return mailing. This barcode removal is fundamentally different than previous methods that simply obscure sprayed barcodes by covering or relocating them to the back of the envelope. The significance of this today is that advances in postal processing equipment allows the USPS to read barcodes printed in any location on both the face and back of an envelope. If there is no barcode in the window or anywhere on the face of an envelope, postal processing equipment may find the relocated barcode on the back of the envelope and the mailpiece may return to the customer, instead of properly returning to the business. Consequently, complete removal of the barcode is critical to ensure that mail is delivered to the intended recipient on a second or subsequent mailing.

Envelopes designed in accordance with the teachings of the present invention may have opening perforations located substantially on a single face of the envelope, either front or back, that are near to or on a fold line to increase the stability of the envelope. Envelopes designed in accordance with the teachings of the present invention may further include a tapered return flap, which in some embodiments may be formed from both of the original back and face of the envelope. The tapered return flap may be formed within the confines of a standard envelope outline through the provision of appropriate score lines or perforations. The perforations forming the return flap may not be functionally required to open the envelope, but are key to forming an acceptable return flap shape for all forms of reusable envelopes.

Envelopes and related methods of managing removal and/or obscuring barcodes are also described in Applicant's U.S. Pat. No. 8,191,763, entitled "Reusable Envelopes", the entire disclosure of which is incorporated herein by reference for all purposes. In addition to the foregoing patent, other patent applications currently pending and assigned to the present assignee which have teachings that are or may be relevant to the present invention, the entire disclosure which is hereby incorporated by reference, include Ser. No. 14/321,784 entitled "Reusable Envelope Structures and Methods" filed Jul. 1, 2014; Ser. No. 13/488,928 entitled "Reusable Envelopes" filed Jun. 5, 2012; and Ser. No. 14/526,506 entitled "Expedited Two-Way Auto-Insertion Mailer" filed Oct. 28, 2014. Finally, the present assignee has developed a number of innovations that overcome the limitations of the return envelope, most particularly by providing a cost-effective and intuitive two-way envelope which may be reliably mailed through modern mail insertion, sorting and handling equipment. Exemplary patents, the teachings and contents which are incorporated herein by reference, include: U.S. Pat. No. 7,549,571 by DeLaVergne, entitled "Environmentally friendly reusable envelope structures"; U.S. Pat. No. 7,726,548 by DeLaVergne, entitled "Reusable envelope structures and methods"; U.S. Pat. No. 7,815,099 by DeLaVergne, entitled "Reusable envelope structures and methods"; U.S. Pat. No. 8,763,891 by DeLaVergne, entitled "Reusable envelope structures and methods"; and U.S. Pat. No. 8,875,985 by DeLaVergne, entitled "Conversion envelopes".

OBJECTS OF THE INVENTION

Exemplary embodiments of the present invention solve inadequacies of the prior art by providing an envelope having an outgoing flap location on top of the envelope, for insertion of materials from the top, with a return flap adjacent to the opposing bottom edge of the envelope. This allows the original seal flap to remain undisturbed on the top of envelope after the initial outgoing seal, and ensures integrity of this seal is retained and not jeopardized. The return flap is formed by a person removing a nominal tear strip. The tear strip simultaneously removes undesirable outgoing postal codes and forms a tapered return seal flap. This is accomplished through a unique flare at each end of the tear strip, with lines of weakness that primarily extend parallel to the long bottom edge of the envelope, but that also wrap from the face across the bottom edge and then to the side edge of the envelope. The removal of the flare is purposely designed to remove paper adjacent to the return seal flap, which reduces the surface area of both sides to facilitate automated postal and remittance processing for return mail.

The present invention and the preferred and alternative embodiments have been developed with a number of objectives in mind. While not all of these objectives may be found in every embodiment, these objectives nevertheless provide a sense of the general intent and the many possible benefits that are available from embodiments of the present invention.

A first object of the invention is to provide a remailable envelope that can be manufactured on existing high-speed converting equipment and inserted from the top on existing high-speed insertion equipment. A second object of the invention is to retain the original outgoing flap in the outgoing sealed configuration to ensure integrity of the envelope and seamless return processing. Another object of the present invention is to locate return perforations on the face of the envelope adjacent to the bottom fold line to remove postal markings when the envelope is opened the first time. A further object of the invention is to maximize the size and shape of the return envelope by removing a minimum amount paper to open and reseal the envelope, while also maintaining Postal Service requirements for size and aspect ratio. Yet another object of the present invention is to form a contour return seal flap as a part of the first opening of the envelope.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
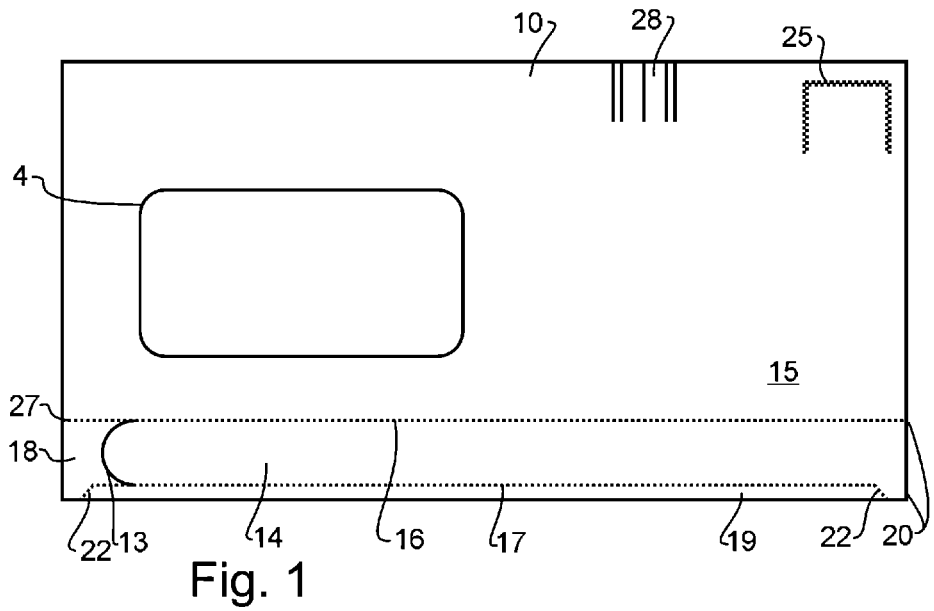
FIG. 1 illustrates a preferred embodiment dual-seal two-way reusable envelope designed in accord with the teachings of the present invention from front view.

The exemplary embodiments of the present invention described herein are not intended to be exhaustive or to limit the present invention to the precise forms disclosed in the following detailed description. Rather the exemplary embodiments described herein are chosen and described so those skilled in the art can appreciate and understand the principles and practices of the present invention.

The present invention provides a unique way to maintain existing insertion of mailpieces from the top and remove outbound barcodes with an envelope that re-opens at the bottom, to reduce a first mailing envelope illustrated by reference numeral 10 in the Figures to a reply envelope 80 visible for example in FIG. 9 that is compatible with remittance processing for reply mail such as may be used with statement mail and direct mail. Various embodiments of envelopes designed in accordance with the teachings of the present invention are preferably laid out to have an exterior geometry matching that of standard envelopes, and will preferably have the features of the present invention formed internally therein.

Figure 2:
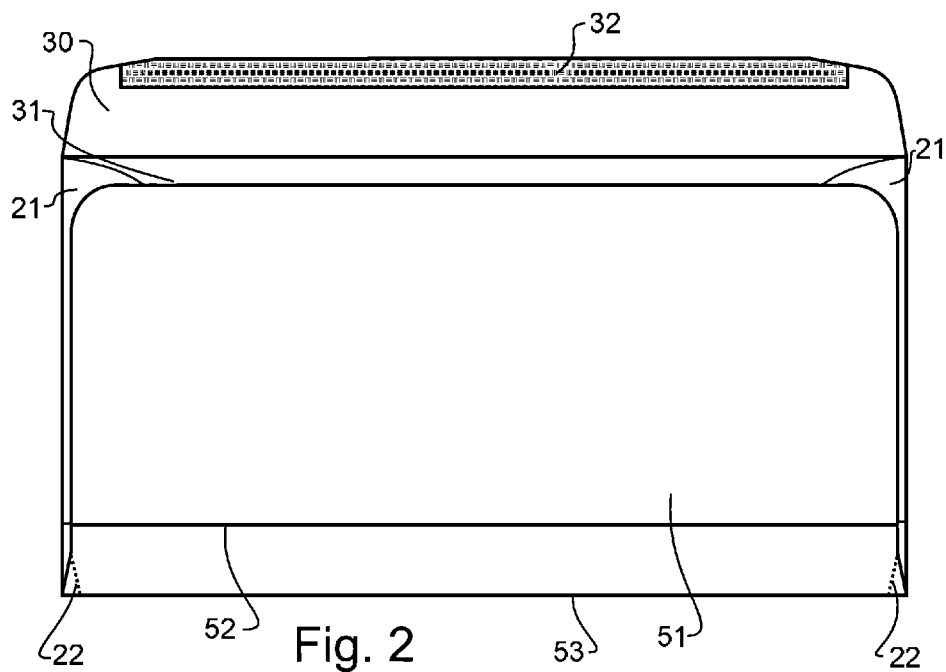
FIG. 2 illustrates the preferred embodiment dual-seal two-way reusable envelope of FIG. 1 in a ready-for-insertion configuration prior to outbound mailing from rear view.
Figure 3:
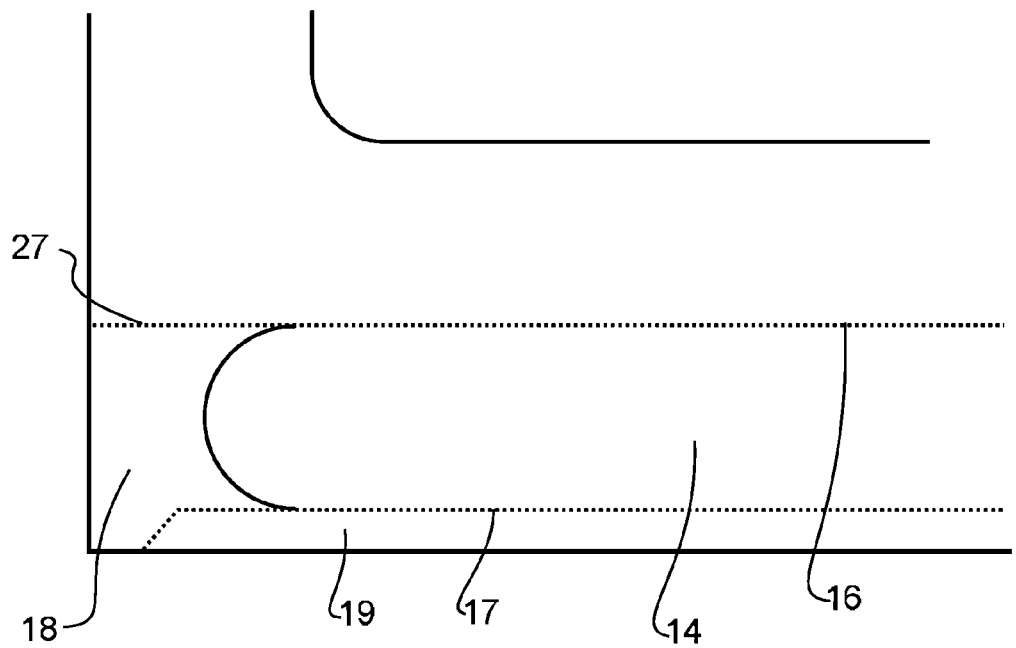
FIG. 3 illustrates the preferred embodiment dual-seal two-way reusable envelope of FIG. 1 from enlarged front partial view, with the opening strip unaltered.

A preferred envelope 10 designed in accordance with the present invention includes a front panel 15 and a back panel 51. Extensions of front panel 15 include side panels 21 on the right and the left, and a seal flap 30 extending from the top of front panel 15. Preferred envelope 10 in the original or prior-to-outbound configuration as illustrated in FIG. 2 has an opening into pocket 31 at the top of envelope 10. An affixer 32 provided on seal flap 30 is used for sealing the envelope for the outbound mailing. For exemplary purposes only and not solely limiting the invention thereto, affixer 32 may be a glue strip or equivalent thereto.

Figure 10:
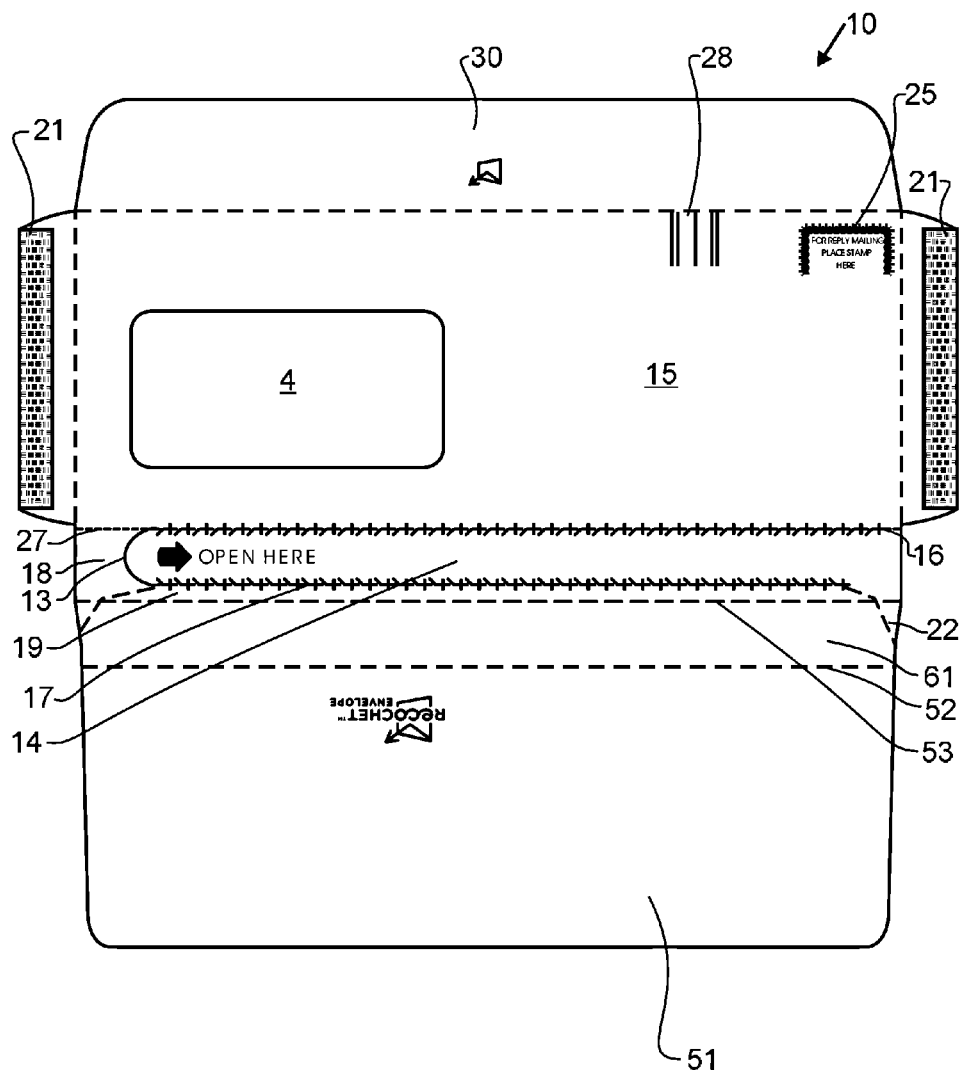
FIG. 10 illustrates the preferred embodiment two-way dual-seal outbound bottom flap return reusable envelope of FIG. 1 in flat sheet form prior to folding and gluing.

In preferred embodiment envelope 10, back panel 51 is folded along score line 53 from the flat sheet shown in FIG. 10 onto the side panels 21 as illustrated in FIG. 2. Side panels 21 are glued or otherwise secured to back panel 51 with the exception of the lower portion 20 of the envelope, between perforation 16 and score line 53, which is not covered by these side panels 21. Once affixed, these side panels 21 on the left and right in combination with front panel 15 and back panel 51 create pocket 31.

The front 15 of first mailing envelope 10 is unique in that recipients open the envelope on the face or front. For exemplary purposes, front 15 is illustrated with a window 4 and FIM 28 (Facing Identification Mark). While a window 4 is illustrated in the preferred embodiment, it will be understood that alternative addressing techniques may be provided, for exemplary and non-limiting purposes such as a non-window, a dual layer label referred to as a piggy back label, or as illustrated in commonly assigned U.S. Pat. No. 7,549,571, the teachings and contents which are incorporated herein, and in commonly assigned patent application Ser. No. 14/526,506 incorporated by reference herein above. In an alternative embodiment, multiple windows may be provided. Likewise, while FIM 28 is illustrated, it will be understood that other similar or equivalent marks may be used, or, where desired for a particular application, omitted entirely.

The window 4 reveals an address with a barcode and postage indicia printed on an envelope insert. The USPS allows postage included in the address block for outgoing presort mail using a barcode address. No postage is printed or applied to the originating envelope when the postage is in the address block. Having the postage in the address block showing through the window leaves the postage area 25 on the envelope available for postage when the envelope is mailed a second time. These methods are conventional for reusable envelopes and are approved by the USPS. In an alternative embodiment, a two-way indicia may be printed on the outer envelope in the upper right corner, or a two-way stamp provided, representing both outbound and return postage, as also disclosed in commonly assigned patent application Ser. No. 14/526,506 incorporated by reference herein above. In a further alternative embodiment, postage may be provided in the upper right corner, over the top of a removable patch such as illustrated in commonly assigned U.S. Pat. No. 7,549,571.

On the back panel 51 of the current invention, unlike other reusable envelopes, is a score line 52 that extends the length of envelope 10. Score line 52 defines the height of reply envelope 80 after envelope 80 is removed from original envelope 10. The height of reply envelope 80 is measured from score line 52 to the distal top edge of envelope 80.

Figure 4:
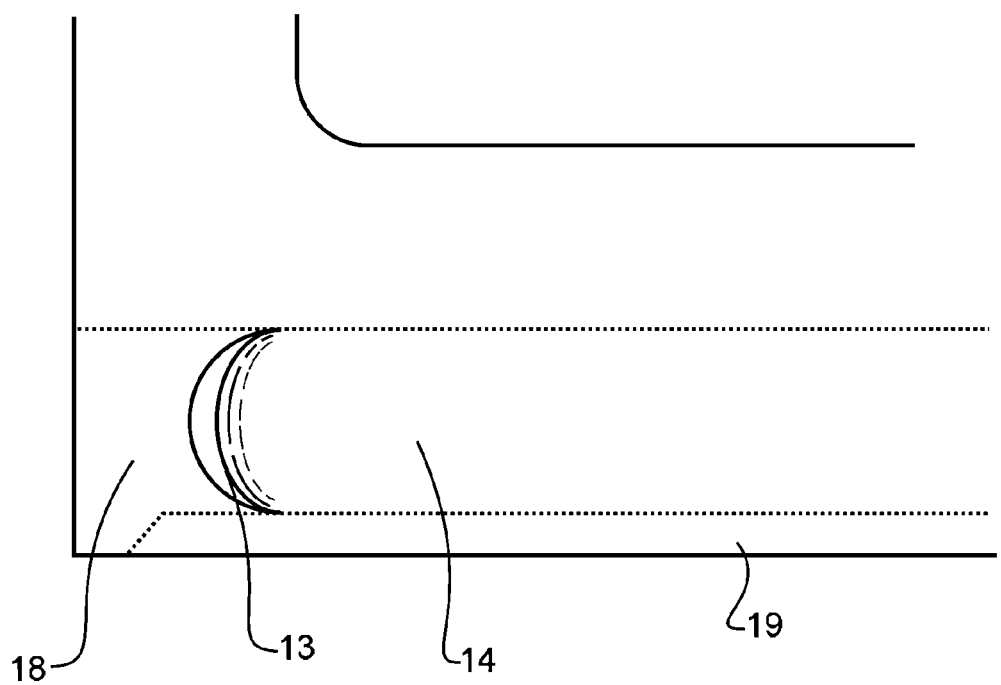
FIG. 4 illustrates the preferred embodiment dual-seal two-way reusable envelope of FIG. 1 from enlarged front partial view, but in a subsequent state with the opening strip being lifted to begin the removal thereof.
Figure 5:
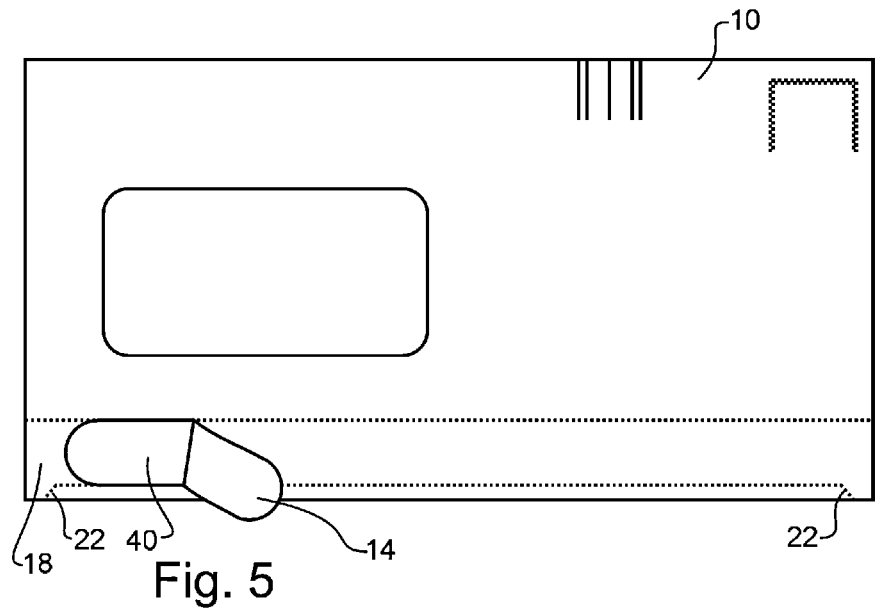
FIG. 5 illustrates the preferred embodiment dual-seal two-way reusable envelope of FIG. 1 from front view, but in a subsequent state with the opening strip partially removed.
Figure 6:
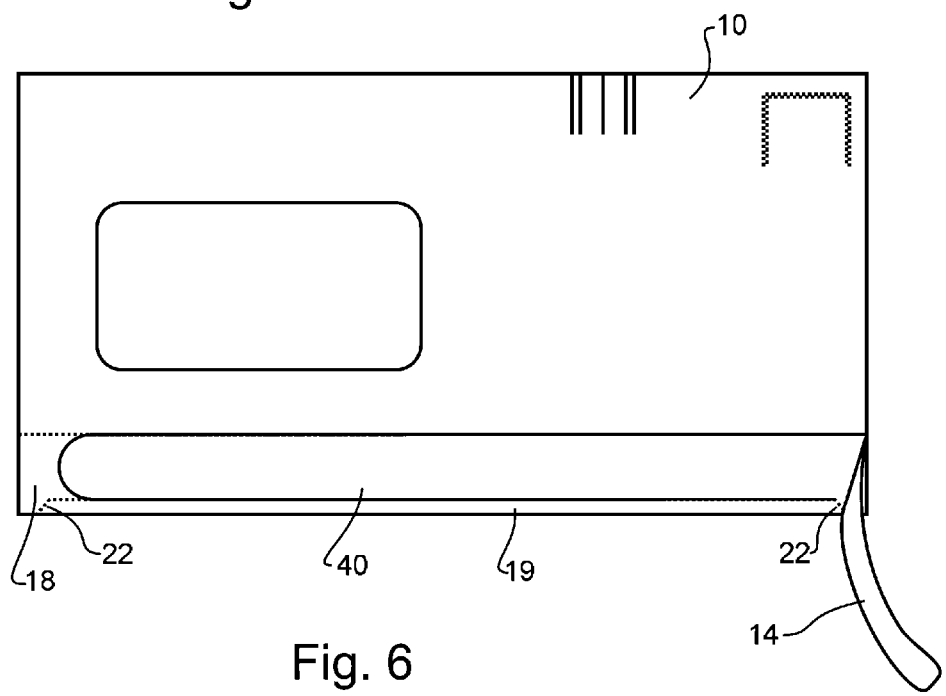
FIG. 6 illustrates the preferred embodiment dual-seal two-way reusable envelope of FIG. 1 from front view, but in a subsequent state with the opening strip almost entirely removed and starting to tear along an angled termination of the bottom perforation.
Figure 7:
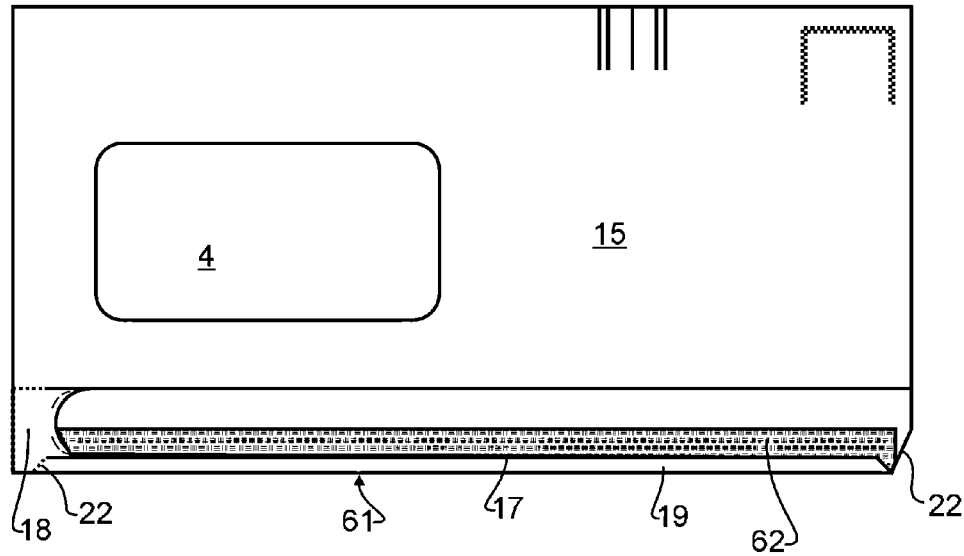
FIG. 7 illustrates the preferred embodiment two-way dual-seal outbound bottom flap return reusable envelope of FIG. 1 from front view, but in a subsequent state with the opening strip fully removed and the contents removed therefrom, thereby revealing the return seal flap and affixer, but with the bridge portion still attached.

When a recipient receives envelope 10, the recipient lifts a tab 13 as illustrated in FIG. 4. Tab 13 may simply be a cut, or may preferably be a small opening slit similar to a kidney bean, hour glass, quarter moon, or other desired shape that allows a finger nail, knife, letter opener, or the like to more readily lift the tab. The recipient will then proceed to tear perforated opening strip 14, formed in front panel 15, along perforations 16, 17 as illustrated in FIGS. 5-7 progressively, until perforated opening strip 14 is completely removed from the remainder of the envelope. Perforations 16, 17 are illustrated in the preferred embodiment envelope 10 as being generally parallel, which is preferred, but it will be understood from the present disclosure that other arrangements may be made, as may be desired by those skilled in the art upon a reading of the present disclosure. Perforation 17 is most preferably offset from score line 53 sufficiently to prevent the envelope from folding in an undesirable and already weakened area. If perforation 17 is too close to score line 53, there is a greater likelihood that envelope 10 will undesirably fold on the perforated line and burst or rip prior to delivery.

While in preferred embodiment first mailing envelope 10 the perforation 17 is offset from score line 53, in an alternative embodiment contemplated herein, perforation 17 is placed directly onto or may be used to replace score line 53. In this alternative embodiment, when envelope 10 is delivered, it may be opened for exemplary purposes using a letter opener to sever perforation 17. This alternative embodiment design is contemplated to have particular utility for senior citizens and other individuals who may have limited manual dexterity, but whom may still open the envelope with a letter opener. As may be apparent, the strength of perforation 17 may be varied based upon a number of factors, such as location, paper weight or strength, and the like.

The perforated opening strip 14 is completely disconnected from front panel 15 when opening strip 14 is pulled off, as illustrated in FIG. 7. Noteworthy here is the fact that side panels 21 terminate just above opening strip 14 and perforation 16, so that opening strip 14 is not inadvertently glued to side panels 21. As may also be apparent from a comparison of FIG. 7 to FIG. 6, perforated opening strip 14 will not only tear along the relatively linear portion of perforation 17, but will also preferably follow the angled termination 22 of perforation 17. The angled terminations 22 of perforation 17 define a tapered edge for the return seal flap 61. A tapered edge for return seal flap 61 significantly improves remittance processing.

This angled termination 22, besides improving postal and remittance processing, serves several additional beneficial purposes. First, to fully tear open the perforation essentially requires intent and manipulation. In other words, if automated machinery inadvertently snags opening strip 14 while the envelope is pulled through the processing machine, the wrap of perforations 22 around the edge adds integrity to better resist an accidental complete opening. Furthermore, the flare within opening strip 14 defined by perforations 22 spreads perforations 27, 17 farther from each other, also reducing the likelihood of being unintentionally torn. In addition, the flare introduced by perforations 22 moves a small portion of the ends of perforation 17 from the front face to the back, meaning that the top perforations 16, 17 do not originate on the same face. Once again, this improves the integrity of the envelope through automated processing.

After perforated opening strip 14 has been pulled off, a bridge portion 18 may remain. The bridge portion 18 is a part of the lower portion 20 of front panel 15 of envelope 10. The original seal flap 30 is attached to the upper portion of back panel 51.

Figure 8:
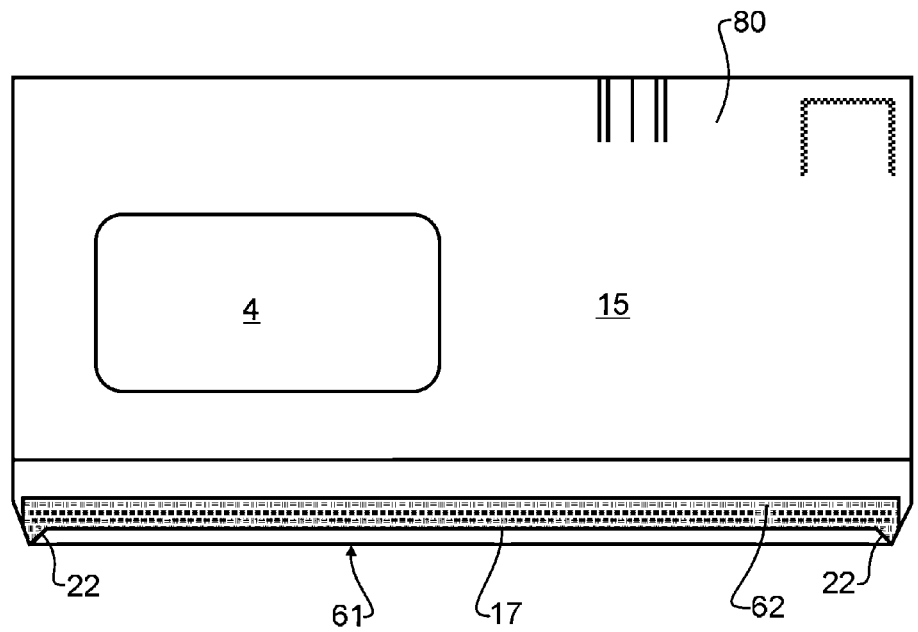
FIG. 8 illustrates the preferred embodiment two-way dual-seal outbound bottom flap return reusable envelope of FIG. 7 from front view, but in a subsequent state with the bridge also fully removed.

After the envelope is opened by removing the perforated opening strip 14 on the front panel 15, the recipient can remove contents 40 held within pocket 31. After envelope 10 is opened and contents are removed, then bridge portion 18 will be removed by the envelope recipient by tearing along perforations 17, 27 in a direction opposite to that used to remove perforated opening strip 14, leaving the envelope as illustrated in FIG. 8. This creates a smaller reply envelope 80 from the original larger envelope 10, while still preserving the bulk of the size and dimension of outgoing envelope 10. As best evident in FIGS. 1, 2, and 10, perforation 17 wraps at angled terminations 22 around front panel 15 around to back panel 51. As noted above, the process of removing lower portion 20 of original envelope 10 along perforations 16, 17 thereby preferably forms a tapered edge of seal flap 61. In an alternative embodiment contemplated herein, perforation 17 could alternatively terminate at score line 53. In such case, seal flap 61 would be rectangular, rather than having the tapers illustrated in FIG. 9.

When the lower portion 20 is separated and completely removed from envelope 10, as illustrated in FIG. 8, what remains is the reply envelope 80 with a seal flap 61 on the bottom, the original window 4, and the upper section of original pocket 31. After new contents are inserted, seal flap 61 is used for sealing reply envelope 80 for the return trip. To resend the new reply envelope 80, seal flap 61 is folded up and bottom lip 19 flattened into the plane of seal flap 61. An affixer 62 provided on seal flap 61, preferably including being provided on bottom lip 19, is used for sealing the envelope when the smaller reply envelope is going to be returned. For exemplary purposes only and not solely limiting the invention thereto, affixer 62 may be a glue strip or equivalent thereto. Affixer 62 will remain part of the envelope body when the lower portion 20 of the envelope 10 is removed. Seal flap 61 is then affixed to front panel 15, as illustrated by FIG. 9.

Figure 9:
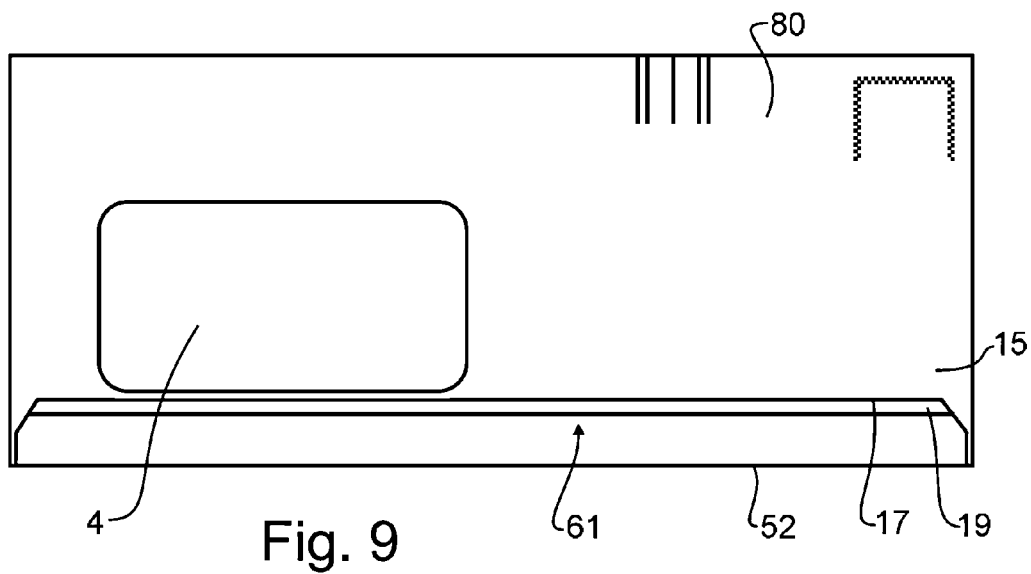
FIG. 9 illustrates the preferred embodiment two-way dual-seal outbound bottom flap return reusable envelope of FIG. 8 from front view, but in a subsequent state with the reseal flap resealed.

In the preferred embodiment reply envelope 80 as illustrated in FIG. 9, seal flap 61 is affixed just below window 4, which provides added strength in that area, which may otherwise be slightly weaker otherwise. Nevertheless, in further alternatives contemplated herein, seal flap 61 may cover a portion or the entirety of window 4.

Most mail that is returned for paying a bill or responding to a solicitation generally uses a No. 9 size reply envelope for which the standard size is approximately 8⅝" wide×3⅞" high. Because there is a general conformity for this size envelope as the standard reply envelope size, companies responsible for collecting and processing the return mail optimize their machines to a standard size for speed, accuracy, and reporting of payments collected. Sizes outside a standard size and thickness cannot be automatically processed or slow the process down, costing companies extra money in processing and sometimes delaying payment from the customer. Thus, a larger envelope for the outgoing envelope is not optimal for remittance and a smaller reply size with uniform thickness and a secure seal flap is critical to ensure on-time processing and payment.

Security of personal information is very important to the public. When sending statements companies take extra measures to protect personal information. Often there is a security tint printed on the inside of the envelope for this purpose.

A unique feature of the present invention is the described security bridge portion 18 and bottom lip 19 created when the perforated opening strip 14 for opening envelope 10 is removed. The bridge portion 18 and the lip 19 each independently of the other and synergistically in combination prevent contents 40 of the envelope from prematurely falling out of pocket 31 if the opening strip 14 is accidentally removed or opened in mail processing or mail delivery. In one alternative embodiment, lip 19 may be eliminated, such as by moving perforation 17 down to the very bottom edge of the envelope. In a further alternative embodiment, the security tab may be removed, and instead a mechanism may be provided for the envelope to be opened with a letter opener, which tends to be a predictable preference for senior citizens.

Retaining the contents is very important in modern society, for several different reasons. The first is the inadvertent spilling of sensitive contents and the associated risk of unintentional disclosure of private personal information.

Another is the associated risk of jamming machines and delaying mail processing. Dual seal-flaps in combination with the security afforded by bridge 18 and lip 19, either independently or synergistically, helps to avoid both of these risks.

For purposes of illustration, bridge 18 will be described on the left side but can be on either the right side, center, or the left, top or bottom. Bottom lip 19 for purposes of illustration will be on the bottom but can be on any side of the envelope.

The USPS sometimes sprays barcodes to correctly identify the delivery address, enabling the mail pieces to be sorted to the correct carrier route for delivering the mail. The USPS sprays the barcodes if the address for some reason is unreadable by postal process equipment, or preferentially if the mail by-passes standard Advanced Facer Canceller System (AFCS) equipment. On the front lower right corner the USPS will spray an IMb barcode if the address or the barcode in the address block is not readable by the mail reading and sorting technology The sprayed IMb barcodes must be obscured or removed from the original mail piece to resend the envelope a second time. The IMb barcode is a priority code; meaning the mail processing and sorting technology may read this barcode before looking for a barcode in the address block. If the sprayed barcodes remain on the envelope when the envelope is sent as a reply envelope the address has little significance and the mail will be routed to the address described in the sprayed barcode on the envelope. If these barcodes are the original address to the recipient and remain on the envelope when the recipient tries to resend the envelope with a new address, the sprayed barcode will route the mail back to the original address, meaning the mail will go back to the initial outgoing recipient rather then to the new address. This can create very undesirable delay and added expense in the delivery of the envelope to the intended recipient. Rerouting and returning prevents the mail from being delivered to the intended destination, will prevent or cause delays in payments, missed or delayed reply for special offers, and other inconveniences.

When the lower portion 20 of envelope 10 is completely removed, barcodes the USPS may spray on the envelope to deliver the mail piece are also completely removed. This removal thereby eliminates any opportunity for the mail to come back to the original recipient after being remailed by the original recipient. In contrast, the prior art methods of obscuring bar codes, such as by folding a portion of the envelope to the other side, are inadequate with changes in the USPS postal processing equipment that may now read the envelope regardless of the side of the envelope that the barcode appears upon. Consequently, the present invention permanently eliminates this potential disruption.

While a portion of envelope 10 is removed, which ensures removal of postal barcodes, the amount of material removed is limited just to that part of the envelope, and to that needed to form a uniquely contoured return flap. Lip 19 is preserved from the lower edge of the envelope face, which is an unmarked portion of the envelope. This lip 19 serves as a part of the needed size for the return seal flap 61, thereby helping to preserve and maximize the size of reply envelope 80.

The use of a top outgoing seal flap 30 and a bottom return seal flap 61 presents additional unexpected synergy. Both the top and bottom flaps may be provided with any of the known adhesives to provide a suitable seal. The top outgoing seal flap 30 forms a multi-layer assembly when affixed to back panel 51, which thereby stiffens the top of both envelope 10 and envelope 80. The bottom return seal flap 61 likewise forms a multi-layer assembly when affixed to front panel 15, which thereby stiffens the bottom of envelope 80. In some cases, stiffer envelope tops and bottoms are believed to reduce the failure rate when processed through standard postal automation equipment. Furthermore, the envelope has a desired more consistent thickness.

The present invention can increase security with light weight paper, which is a trend for major mailers seeking cost savings associated with lighter weight paper. Mailers have already shifted from 24 pound paper to 22 pound, and some are now mailing with 20 pound high bulk paper.

Various embodiments of apparatus designed in accord with the present invention have been illustrated in the Figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 11:
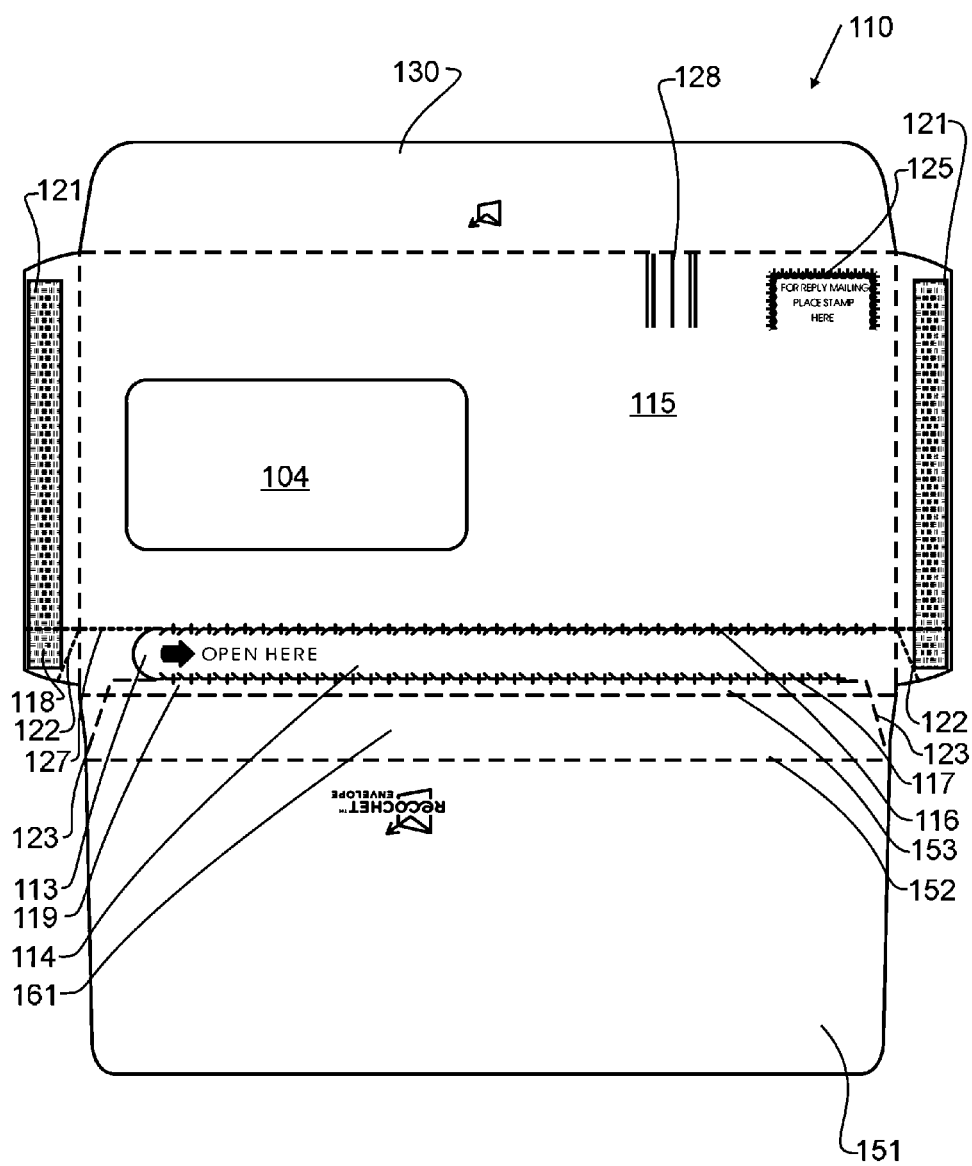
FIG. 11 illustrates a first alternative embodiment two-way dual-seal outbound bottom flap return reusable envelope in flat sheet form prior to folding and gluing.

FIG. 11 illustrates a first alternative embodiment two-way top flap outbound bottom flap return reusable envelope 110 in flat sheet form prior to folding and gluing. This embodiment differs from that of FIGS. 1-10 in that the side panels 121 extend entirely from the top of envelope 110 adjacent to seal flap 130 to bottom-defining score line 153. In order for perforated opening strip 114 and bridge 118 to remove through side panels 121, and to also form the bevels for seal flap 161, additional perforations 122, 123 are provided that essentially form a "V" shaped or "Y" shaped perforation with perforations 116, 127. Note that perforation 123 will be in alignment with perforation 122 when envelope 110 is folded to a pre-outbound ready for insertion configuration similar to that configuration illustrated in FIG. 2.

First alternative embodiment two-way top flap outbound bottom flap return reusable envelope 110 of FIG. 11 also illustrates two exemplary, but alternative, perforation concepts. In one embodiment, perforation 117 will terminate at perforations 123, and, contrary to the illustration, not extend outward therefrom. In such case, the combination of perforations 122, 123 provide a tapered edge to seal flap 161, similar to tapered flap 61 of preferred embodiment envelope 10. While such a taper is preferred, in an alternative embodiment contemplated herein, perforations 122, 123 may be omitted and perforation 117 will instead extend to the side edges of the envelope as illustrated. In such case, seal flap 161 will be rectangular, rather than having the tapers illustrated in FIG. 9. As noted herein above, this is less desirable from a remittance perspective.

Figure 12:
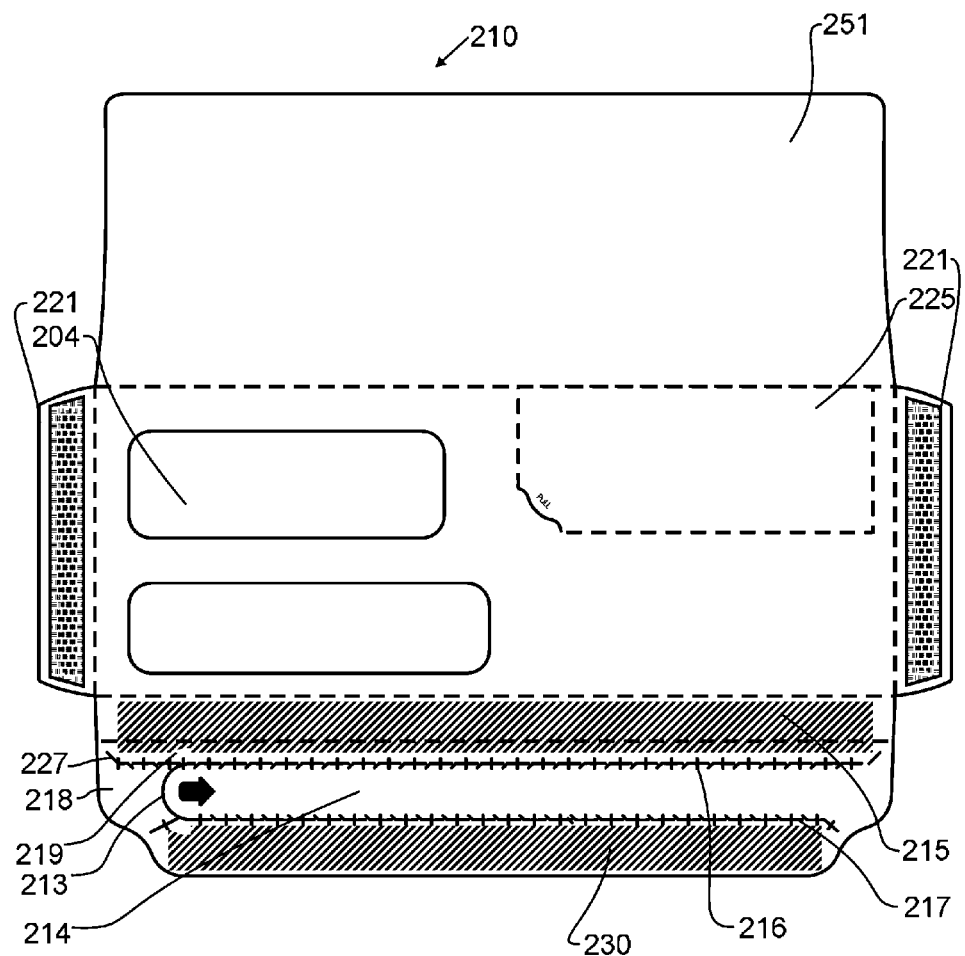
FIG. 12 illustrates a second alternative embodiment two-way dual-seal outbound bottom flap return reusable envelope in flat sheet form prior to folding and gluing.

FIG. 12 illustrates a second alternative embodiment two-way dual-seal outbound bottom flap return reusable envelope 210 in flat sheet form prior to folding and gluing. This embodiment differs from that of FIGS. 1-10 in that the seal flap 230 is scalloped. The specific geometry of the seal flaps in each of the embodiments may be determined by an envelope designer using criteria known in the industry, and any suitable geometry may be used. In addition, none of the perforations 216, 217, 227 extend entirely to the edge of the envelope 210. Instead, a small gap is left between the edge of the envelope blank and these perforations. This provides slightly greater strength and durability in the envelope. In an alternative embodiment, a score line may be used to directionally guide the opening. Additionally, instead of a single window 4, two windows 204 are illustrated, and a patch 225 is provided to allow removal of postage marks and cancellations.

As an example, though not limiting the present invention thereto, perforation 227 at the top of the perforated opening strip 214 extends to the top of bridge section 218, continuing to approximately ¼" from the edge of the envelope. In this exemplary embodiment, perforation 227 extends to a position adjacent to the edge of the envelope, for exemplary purposes ¼" from the left edge of the envelope. Having perforation 227 along the top of bridge 218 terminating adjacent to but some small distance from either the left edge of the envelope or in an alternative embodiment from both edges prevents a weakened edge at that point along the side of the envelope that can possibly cause weakness and tearing in mail processing.

While perforation 217 is illustrated in this alternative embodiment as also terminating a small distance from both edges of envelope 210, this perforation 217 will preferably extend entirely to the edges of back panel 251 as illustrated in the envelopes 10, 110. In such instance, and in a further alternative embodiment, score lines and other lines of weakness may be extended to the edge of seal flap 230. While perforation 217 may be extended entirely to the edge of seal flap 230, by using a second type of line of weakness, preferably one that is more difficult to separate the paper at than perforation 217, the perforated opening strip 214 will be more likely to tear off and provide a clean edge for the return seal flap 261, without leaving a chad behind, and yet will still be less likely to separate and fail during processing and delivery.

In order to provide better protection for perforation 217 during mailing, and as best illustrated by perforation 17 in FIG. 2, while perforation 17 extends to the edge of back panel 51, back panel 51 does not extend to the full width of side panels 21. This means that perforation 17 is not exposed to the edge of the envelope, and so is also protected during automated handling. As may be appreciated then, the same can be applied to perforation 217, if so desired.

Figure 13:
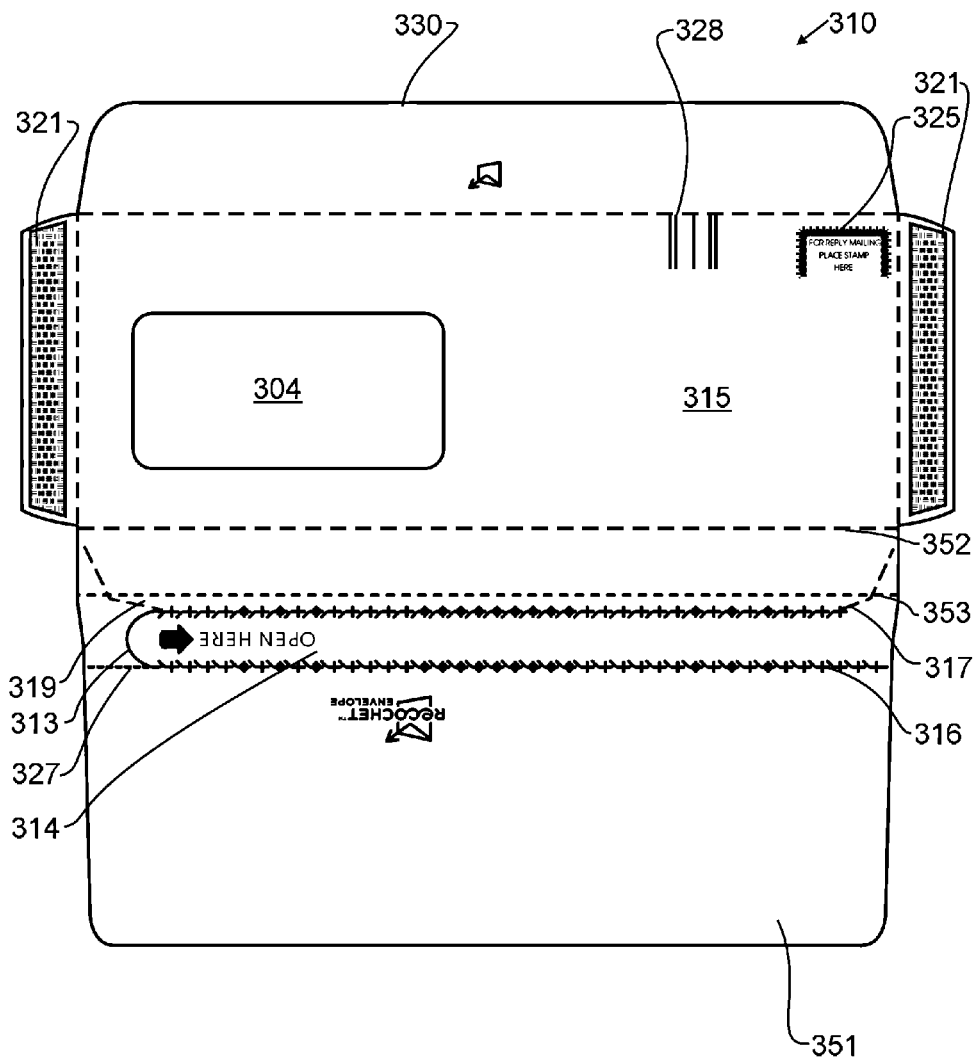
FIG. 13 illustrates a third alternative embodiment two-way dual-seal outbound bottom flap return reusable envelope in flat sheet form prior to folding and gluing.

FIG. 13 illustrates a third alternative embodiment two-way dual-seal outbound bottom flap return reusable envelope 310 in flat sheet form prior to folding and gluing. In this embodiment, the perforated opening strip 314 has been moved to the back side of the envelope to accommodate removal of the Canadian VES code. As a result, several of the perforations and score lines have been rearranged, as illustrated. As this alternative illustrates, opening strip 314 may be provided on either the front panel 315, or the back panel 351.

While the foregoing details what is felt to be the preferred embodiment of the invention, no material limitations to the scope of the claimed invention are intended. Further, features and design alternatives that would be obvious to one of ordinary skill in the art are considered to be incorporated herein. For exemplary purposes only, and not solely limiting the invention thereto, in the preferred and alternative embodiment envelopes 10, 110, 210 illustrated herein, the opening strips 14, 114, 214 are on the front face, and the return seal flaps are formed from the back face. Nevertheless, it is contemplated herein in some alternatives to reverse this, so that the opening strips are on the back face, and the return seal flaps are formed on the front. Consequently, the scope of the invention is set forth and particularly described in the claims herein below.

I claim:

1. A reusable dual-seal outbound top flap return bottom flap envelope, comprising:
    an envelope pocket configured to receive and retain an envelope insert, and having a front panel, a back panel generally parallel to and spaced from said front panel and adjoined to said front panel along two sides and along a bottom, said back panel disconnected from said front panel along a top edge of said back panel and thereby defining an opening into said envelope pocket adjacent to a top of said back panel;
    an outbound seal flap extending from a top of said front panel distal from said envelope pocket bottom;
    an outbound affixer configured to seal said outgoing seal flap to said envelope pocket and thereby close said envelope pocket prior to an outbound mailing;
    a lower line of weakness formed in said envelope pocket on a first one of said front and back panels generally adjacent to but offset from said envelope pocket bottom and crossing said envelope bottom to a second one of said front and back panels prior to terminating adjacent to a first one of said two sides;
    an upper line of weakness formed in said envelope pocket and spaced from said lower line of weakness by a tear strip width and thereby defining a tear strip therebetween, said tear strip configured upon removal from said envelope pocket to open said envelope pocket adjacent to said envelope pocket bottom; and
    a tapered return seal flap incorporating portions of both of said front and back panels and having a return seal flap edge defined by said lower line of weakness; and
    a return affixer adjacent to said return seal flap edge and configured to seal said tapered return seal flap to said first one of said front and back panels and thereby close said envelope pocket subsequent to said tear strip removal prior to a return mailing;
    wherein said lower line of weakness crosses said envelope bottom to a second one of said front and back panels prior to terminating adjacent to a second one of said two sides.

2. The reusable dual-seal outbound top flap return bottom flap envelope of claim 1, wherein said tear strip is configured to receive postal codes applied to said envelope during outgoing mail delivery processing, and to remove said received postal codes from said envelope pocket upon separation therefrom.

3. A reusable dual-seal outbound top flap return bottom flap envelope, comprising:
    an envelope pocket configured to receive and retain an envelope insert, and having a front panel, a back panel generally parallel to and spaced from said front panel and adjoined to said front panel along two sides and along a bottom, said back panel disconnected from said front panel along a top edge of said back panel and thereby defining an opening into said envelope pocket adjacent to a top of said back panel;
    an outbound seal flap extending from a top of said front panel distal from said envelope pocket bottom;
    an outbound affixer configured to seal said outgoing seal flap to said envelope pocket and thereby close said envelope pocket prior to an outbound mailing;
    a lower line of weakness formed in said envelope pocket on a first one of said front and back panels generally adjacent to but offset from said envelope pocket bottom and crossing said envelope bottom to a second one of said front and back panels prior to terminating adjacent to a first one of said two sides;

an upper line of weakness formed in said envelope pocket and spaced from said lower line of weakness by a tear strip width and thereby defining a tear strip there between, said tear strip configured upon removal from said envelope pocket to open said envelope pocket adjacent to said envelope pocket bottom; and a tapered return seal flap incorporating portions of both of said front and back panels and having a return seal flap edge defined by said lower line of weakness; and a return affixer adjacent to said return seal flap edge and configured to seal said tapered return seal flap to said first one of said front and back panels and thereby close said envelope pocket subsequent to said tear strip removal prior to a return mailing;

further comprising a tear starting tab formed entirely in said first one of said front and back panels and configured to be manually forced to initiate a tear in said upper and lower lines of weakness.

4. The reusable dual-seal outbound top flap return bottom flap envelope of claim 3, wherein said tear strip further comprises a first end adjacent said first one of said two sides and a second end adjacent a second one of said two sides, and said tear starting tab is intermediate along said tear strip between said tear strip first and second ends.

5. The reusable dual-seal outbound top flap return bottom flap envelope of claim 4, wherein said lower line of weakness crosses said envelope bottom to a second one of said front and back panels prior to terminating adjacent to a second one of said two sides.

6. The reusable dual-seal outbound top flap return bottom flap envelope of claim 4, wherein said tear strip further comprises a first portion removed with said tear starting tab, and a second portion defining a bridge between said front and back panels that in combination with said tapered return seal flap is configured when said first tear strip portion is removed to further operatively define a lip adjacent to said envelope pocket bottom that includes both front and back panel portions that are operative to retain said envelope insert within said envelope pocket.

7. A reusable dual-seal outbound top flap return bottom flap envelope, comprising:

an envelope pocket configured to receive and retain an envelope insert, and having a front panel, a back panel generally parallel to and spaced from said front panel and adjoined to said front panel along two sides and along a bottom, said back panel disconnected from said front panel along a top edge of said back panel and thereby defining an opening into said envelope pocket adjacent to a top of said back panel;

an outbound seal flap extending from a top of said front panel distal from said envelope pocket bottom;

an outbound affixer configured to seal said outgoing seal flap to said envelope pocket and thereby close said envelope pocket prior to an outbound mailing;

a lower line of weakness formed in said envelope pocket on a first one of said front and back panels generally adjacent to but offset from said envelope pocket bottom and crossing said envelope bottom to a second one of said front and back panels prior to terminating adjacent to a first one of said two sides;

an upper line of weakness formed in said envelope pocket and spaced from said lower line of weakness by a tear strip width and thereby defining a tear strip there between, said tear strip configured upon removal from said envelope pocket to open said envelope pocket adjacent to said envelope pocket bottom; and a tapered return seal flap incorporating portions of both of said front and back panels and having a return seal flap edge defined by said lower line of weakness; and a return affixer adjacent to said return seal flap edge and configured to seal said tapered return seal flap to said first one of said front and back panels and thereby close said envelope pocket subsequent to said tear strip removal prior to a return mailing;

wherein said upper line of weakness is formed entirely in said first one of said front and back panels; and wherein said upper line of weakness further comprises a straight line, and said lower line of weakness further comprises a first straight line segment parallel to and offset from said envelope pocket bottom and a second straight line segment angularly offset from said first straight line segment.

8. The reusable dual-seal outbound top flap return bottom flap envelope of claim 7, wherein said second straight line segment angular offset from said first straight line segment further comprises an angle intermediate between zero and ninety degrees that is configured to define a tapered return seal flap edge for said tapered return seal flap.

9. A reusable dual-seal envelope, comprising:

an envelope pocket configured to receive and retain an envelope insert, and having a front panel, a back panel generally parallel to and spaced from said front panel and adjoined to said front panel along two sides and along a bottom, said back panel disconnected from said front panel along a top edge of said back panel and thereby defining an opening into said envelope pocket adjacent to a top of said back panel;

an outbound seal flap extending from a top of said front panel distal from said envelope pocket bottom;

an outbound affixer configured to seal said outgoing seal flap to said envelope pocket and thereby close said envelope pocket prior to an outbound mailing;

a first line of weakness formed in said envelope pocket;

a second line of weakness formed in said envelope pocket and spaced from said first line of weakness by a tear strip width and thereby defining a tear strip there between, said tear strip configured upon removal from said envelope pocket to open said envelope pocket, said tear strip extending in a first longitudinal direction generally parallel to at least one of said two sides, said bottom, and said front panel top, and terminating in a first end that wraps from a first one of said front and back panels to a second one of said front and back panels adjacent to said first end and across said at least one of said two sides, said bottom, and said front panel top and thereby incorporating portions of both of said front and back panels; and a tapered return seal flap having a return seal flap edge defined by said first line of weakness; and a return affixer adjacent to said return seal flap edge and configured to seal said tapered return seal flap to said first one of said front and back panels and thereby close said envelope pocket subsequent to said tear strip removal prior to a return mailing;

wherein said second line of weakness is formed in said front panel, and said first line of weakness further comprises a linear portion parallel to said envelope pocket bottom and a first angled termination extending from and angularly offset from said linear portion, and terminating on said back panel adjacent to a first one of said first and second edges.

10. The reusable dual-seal envelope of claim 9, wherein said first line of weakness further comprises a second angled termination extending from and angularly offset from said first segment distal to said first angled termination, and terminating on said back panel adjacent to a second one of said first and second edges distal to said first one of said first and second edges.

11. The reusable dual-seal envelope of claim 9, wherein said first line of weakness terminates at either distal end spaced from either of said first and second edges.

12. The reusable dual-seal envelope of claim 9, wherein said linear portion of said line of weakness extends offset from said envelope pocket bottom.

13. The reusable dual-seal envelope of claim 9, wherein said first line of weakness extends in said front panel parallel with and offset from said envelope pocket bottom, and said second line segment extends in both said front and back panels, and crosses said envelope pocket bottom.

14. A reusable top flap envelope, comprising:
a first major surface;
a second major surface;
a first edge adjoining said first and second major surfaces;
a second edge generally parallel with and distal to said first edge adjoining said first and second major surfaces;
a third edge generally perpendicular to said first and second edges and extending there between adjoining said first and second major surfaces;
an opening into a space between said first and second major surfaces distal to said third edge;
said opening, said first and second major surfaces, and said first, second, and third edges defining an envelope pocket;
an outgoing seal flap extending from a first one of said first and second major surfaces and located distal to said third edge and adjacent said opening and configured to affix with a second one of said first and second major surfaces and thereby generally close said opening and thereby close said reusable top flap envelope in a first outgoing mailing;
a tear strip configured upon removal from said envelope pocket to open said envelope pocket adjacent to said third edge and to form a tapered return seal flap;
said tapered return seal flap having a first border adjoining to said envelope pocket, a second border shorter than said tapered return seal flap first border and more distal to said outgoing seal flap than said tapered return seal flap first border, a third border extending between said tapered return seal flap first border and said tapered return seal flap second border, and a fourth border distal from said tapered return seal flap third border and extending between to said tapered return seal flap first border and said tapered return seal flap second border; and
a return seal configured to seal said tapered return seal flap to said envelope pocket and thereby close said envelope pocket subsequent to said tear strip removal;

wherein said tapered return seal flap further comprises portions of both of said first and second major surfaces.

15. The reusable top flap envelope of claim 14, wherein said tapered return seal flap further comprises a trapezoid.

16. A reusable top flap envelope, comprising:
a first major surface;
a second major surface;
a first edge adjoining said first and second major surfaces;
a second edge generally parallel with and distal to said first edge adjoining said first and second major surfaces;
a third edge generally perpendicular to said first and second edges and extending there between adjoining said first and second major surfaces;
an opening into a space between said first and second major surfaces distal to said third edge;
said opening, said first and second major surfaces, and said first, second, and third edges defining an envelope pocket;
an outgoing seal flap extending from a first one of said first and second major surfaces and located distal to said third edge and adjacent said opening and configured to affix with a second one of said first and second major surfaces and thereby generally close said opening and thereby close said reusable top flap envelope in a first outgoing mailing;
a tear strip configured upon removal from said envelope pocket to open said envelope pocket adjacent to said third edge and to form a tapered return seal flap;
said tapered return seal flap having a first border adjoining to said envelope pocket, a second border shorter than said tapered return seal flap first border and more distal to said outgoing seal flap than said tapered return seal flap first border, a third border extending between said tapered return seal flap first border and said tapered return seal flap second border, and a fourth border distal from said tapered return seal flap third border and extending between to said tapered return seal flap first border and said tapered return seal flap second border; and
a return seal configured to seal said tapered return seal flap to said envelope pocket and thereby close said envelope pocket subsequent to said tear strip removal;
wherein said tear strip further comprises a line of weakness formed in said envelope pocket having a first segment on said first one of said first and second major surfaces generally adjacent to and offset from said envelope pocket third edge, a second segment extending from said first segment, crossing said envelope pocket third edge to said second one of said first and second major surfaces, and terminating adjacent to a first one of said first and second edges, and a third segment extending from said first segment, crossing said envelope pocket third edge to a first one of said first and second major surfaces, and terminating adjacent to a second one of said first and second edges.

* * * * *